US011932282B2

(12) United States Patent
Caldwell et al.

(10) Patent No.: US 11,932,282 B2
(45) Date of Patent: Mar. 19, 2024

(54) VEHICLE TRAJECTORY CONTROL USING A TREE SEARCH

(71) Applicant: Zoox, Inc., Foster City, CA (US)

(72) Inventors: Timothy Caldwell, Mountain View, CA (US); Rasmus Fonseca, Boulder Creek, CA (US); Arian Houshmand, Mountain View, CA (US); Xianan Huang, Foster City, CA (US); Marin Kobilarov, Baltimore, MD (US); Lichao Ma, Santa Clara, CA (US); Chonhyon Park, San Jose, CA (US); Cheng Peng, Sunnyvale, CA (US); Matthew Van Heukelom, San Francisco, CA (US)

(73) Assignee: ZOOX, INC., Foster City, CA (US)

( * ) Notice: Subject to any disclaimer, the term of this patent is extended or adjusted under 35 U.S.C. 154(b) by 259 days.

(21) Appl. No.: 17/394,334

(22) Filed: Aug. 4, 2021

(65) Prior Publication Data
US 2023/0041975 A1    Feb. 9, 2023

(51) Int. Cl.
*B60W 60/00*      (2020.01)
*G05B 13/02*      (2006.01)

(52) U.S. Cl.
CPC ..... *B60W 60/0027* (2020.02); *G05B 13/0265* (2013.01); *B60W 2554/402* (2020.02); *B60W 2554/4045* (2020.02)

(58) Field of Classification Search
CPC ....... B60W 60/0027; B60W 2554/402; B60W 2554/4045; G05B 13/0265
See application file for complete search history.

(56) References Cited

U.S. PATENT DOCUMENTS

| 2004/0117079 | A1 | 6/2004 | Hulden |
| 2017/0219353 | A1* | 8/2017 | Alesiani ............... G05D 1/0212 |
| 2018/0150081 | A1* | 5/2018 | Gross ................... G05D 1/0217 |
| 2019/0369637 | A1 | 12/2019 | Shalev-Shwartz et al. |

(Continued)

FOREIGN PATENT DOCUMENTS

| JP | 202004677 A | 3/2020 |
| WO | WO201710477 A1 | 6/2017 |

OTHER PUBLICATIONS

The PCT Search Report and Written Opinion dated Nov. 23, 2022 for PCT application No. PCT/US2022/039423, 9 pages.

*Primary Examiner* — Dale W Hilgendorf
*Assistant Examiner* — Hana Lee
(74) *Attorney, Agent, or Firm* — Lee & Hayes P.C.

(57) ABSTRACT

Trajectory generation for controlling motion or other behavior of an autonomous vehicle may include alternately determining a candidate action and predicting a future state based on that candidate action. The technique may include determining a cost associated with the candidate action that may include an estimation of a transition cost from a current or former state to a next state of the vehicle. This cost estimate may be a lower bound cost or an upper bound cost and the tree search may alternately apply the lower bound cost or upper bound cost exclusively or according to a ratio or changing ratio. The prediction of the future state may be based at least in part on a machine-learned model's classification of a dynamic object as being a reactive object or a passive object, which may change how the dynamic object is modeled for the prediction.

20 Claims, 10 Drawing Sheets

(56) References Cited

U.S. PATENT DOCUMENTS

| | | | | |
|---|---|---|---|---|
| 2019/0377351 A1* | 12/2019 | Phillips | ................ | B62D 15/025 |
| 2020/0377085 A1* | 12/2020 | Floyd-Jones | ......... | B60W 30/09 |
| 2020/0401135 A1* | 12/2020 | Chen | .................... | G05D 1/0088 |
| 2021/0046924 A1 | 2/2021 | Caldwell et al. | | |

\* cited by examiner

VEHICLE TRAJECTORY CONTROL USING A TREE SEARCH

BACKGROUND

An autonomous vehicle may fail to navigate accurately and/or efficiently when normative operating conditions are altered, such as when roadway indicators are obscured (e.g., by snow, garbage, sand), degraded (e.g., burned out light, worn out lane markings), and/or invalidated (e.g., an obstruction partially blocks a lane, traffic signage and/or traffic cones indicate an alternate lane that conflicts with original lane markings). Moreover, various environmental factors and human and animal behavior may be erratic or unpredictable, which may further make autonomous vehicle navigation difficult.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

FIGS. 7A and 7B also illustrate the result of agent filtering that alters the classification of a dynamic object from a reactive object to a passive object for use by the prediction and/or simulation component in generating a next level of prediction node(s).

DETAILED DESCRIPTION

Figure 1:
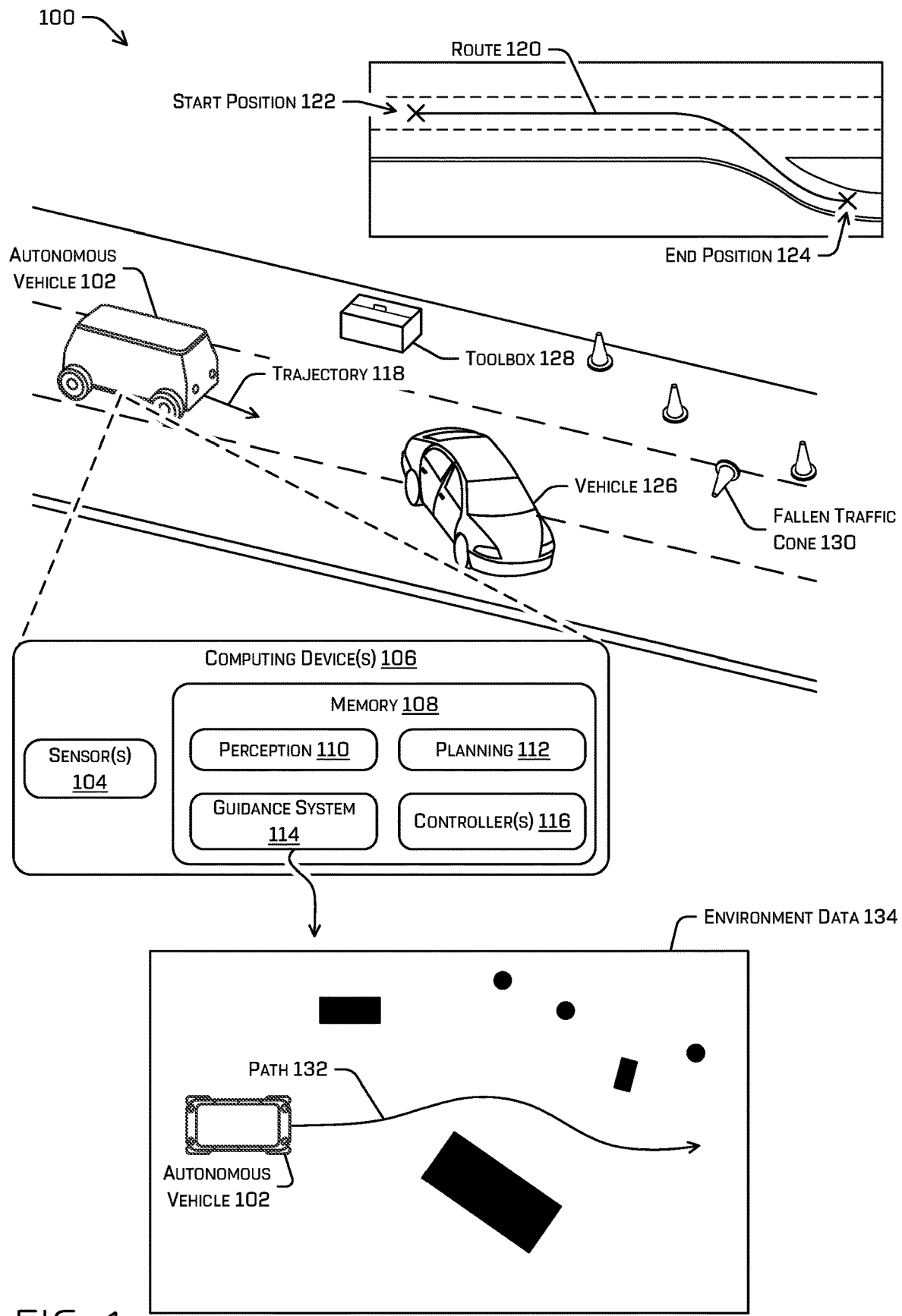
FIG. 1 illustrates an autonomous vehicle and an example scenario in which lane references (whether previously mapped or detected) may not be reliable for determining instructions for controlling motion of the vehicle.

As discussed above, it may be difficult to prepare an autonomous vehicle for all contingencies because of the occurrence of anomalous behavior and variances in road conditions. These situations may cause the autonomous vehicle to stutter or hesitate, stop completely when a human driver would be able to navigate the situation, and/or need to transmit a request for help from a remote operator (or "teleoperator"). This application relates to techniques for increasing the number of scenarios the autonomous vehicle can safely and efficaciously navigate, e.g., without stopping, without stuttering, without the need to request help from a teleoperator, and/or by decreasing a likelihood of an impact occurring, particularly for aberrant circumstances but also for normative driving conditions. For example, the techniques discussed herein may decrease the occurrence of autonomous vehicle stops or stutters for normative situations such as traffic cones that have been knocked into the middle of a lane, when an object such as a vehicle is blocking part of two lanes, trash laying in the street, complex junctions with multiple vehicles and pedestrians, navigating in a gravel area with no lane markings, etc.

The techniques discussed herein may include an autonomous vehicle guidance system that generates a path for controlling an autonomous vehicle based at least in part on a tree search technique that alternately determines a candidate action and predicts a future state of the environment associated with the autonomous vehicle responsive to the candidate action. In some examples, the tree search technique may include detecting a static object and a dynamic object in the environment associated with the autonomous vehicle and classifying, via a machine-learned (ML) model, the dynamic object as a reactive object or a passive object. A reactive object may be likely (as measured by a confidence output by the ML model) to alter its movement in response to an action of the autonomous vehicle; whereas a passive object's movement may be unlikely to change based on a movement of the autonomous vehicle.

The ML model may receive a track or at least a pose (e.g., position and/or orientation) associated with the autonomous vehicle, a track associated with the dynamic object, and/or sensor data associated with the dynamic object and may be trained to output a confidence score indicating a likelihood that an action of the dynamic object will be responsive to/affected by an action of the autonomous vehicle. A track may identify a historical, current, and/or predicted pose, velocity, acceleration, object classification (this may or may not be immutable—e.g., the classification "vehicle" is likely to be immutable, whereas "cyclist" may alter since a cyclist may dismount and become a pedestrian), etc. of a detected object. In some examples, if the confidence score determined by the ML model meets or exceeds a confidence threshold, the detected object may be classified as a reactive object; otherwise, the detected object may be classified as a passive object. In some examples, classifying the detected object as a dynamic object may be handled by a different ML model, such as an ML model that determines a track associated with a detected object. Regardless and more simply, a dynamic object may be an object detected as moving, having moved, and/or being associated with an object classification associated with objects capable of movement. In some examples, another ML model may determine a static object map (e.g., a map indicating space occupied by static object(s) and/or "free space" in an environment) and/or one or more dynamic object maps (e.g., a map indicating a likelihood that a location in the environment will be occupied by a moving object or a stationary object that may move at a future time). These map(s) may be used for a cost determination portion of the tree search executed by the vehicle guidance system.

The tree search discussed herein may alternately determine a candidate action and a predicted state of the environment associated with (e.g., at least partially responsive to) the candidate action at a future time step, another candidate action based on the predicted state of the environment, a second predicted state of the environment associated with the additional candidate action at a further future time step, and so on, up to a time horizon or a specified number of actions. A candidate action may indicate, for example, a trajectory for controlling motion of the vehicle, activating emitters of the vehicle (e.g., a turn signal, a headlight, a speaker), and/or the like. Each candidate action may be associated with a different action node and each predicted environment state may be associated with a prediction node of the tree. As an initial operation, the tree search may determine, based at least in part on sensor data, a current state of an environment associated with the autonomous vehicle, which may include dynamic objects and/or static objects. This initial state may be associated with a root node. The root node may be a prediction node, in at least one example. The root node and/or any of the other prediction nodes may identify a dynamic object as a reactive object or a passive object as part of the state of the environment indicated by the prediction node. The state of the environment may be indicated by a data structure associated with the root node/prediction node, in some examples.

Using this initial state, the tree search may determine one or more candidate actions for exploration. A candidate action may comprise a coarse maneuver, such as "stay in same lane," "lane change left," "execute right turn," "stop," or the like; and/or fine instructions such as a curve that defines and/or is associated with a position, steering angle, steering rate, velocity, and/or acceleration for the vehicle controller to track. In some examples, determining the one or more candidate actions for exploration may comprise transmitting the initial environment state (or the state that is indicated by a particular prediction node of a branch that is being explored at predictions nodes deeper than the initial node) to the planning component of the vehicle and receiving the set of candidate actions from the planning component. The planning component may be a nominal planning component of the vehicle that generates trajectory(ies) for controlling motion and/or operation of the vehicle in contrast to a contingent planning component that controls the vehicle during aberrant or emergency situations, although it is contemplated that a contingent planning component may additionally or alternatively provide generate candidate action(s) for use by the tree search. A tree search component may associate the one or more candidate actions of the set received from the planning component with action nodes.

In some examples, each candidate action may be associated with its own action node. For example, a candidate action may be associated with an action node that is dependent on the root node, which indicates the state upon which the candidate action was based. Although in one example, each candidate action may be associated with an individual action node, in additional or alternate examples, a machine-learned (ML) model may cluster the candidate actions and determine a representative candidate action to represent two or more candidate actions of a cluster. In such examples, nodes associated with the different candidate actions of the same cluster may be merged into a single action node. The action node may, in some examples, identify the representative candidate action or, in other examples, the action node may indicate the representative and the two or more candidate actions associated therewith. In examples where action nodes have been merged, a lowest cost candidate action, from among the two or more candidate actions represented by the action node, may be selected for subsequent exploration and/or inclusion in a path.

The tree search may transmit a candidate action and the state upon which the candidate action was based (i.e., the initial state in this example) to a simulation and/or prediction system of a perception component of the vehicle. The simulation system may be part of a prediction component for generating estimated future trajectories for object(s). The simulation system may determine a predicted state of the environment based at least in part on the candidate action. This may include predicting how passive and/or reactive dynamic objects will behave based at least in part on the candidate action. The prediction generated by the simulation system may be associated with a future time and may be used to generate a prediction node that depends from the action node associated with the candidate action and indicates the predicted state of the environment that may result from implementing the candidate action.

The tree search may additionally or alternatively determine a cost associated with a candidate action. This cost may be based at least in part on a prediction of how close the candidate action would cause the autonomous vehicle to pass static object(s) and/or dynamic object(s); a proximity of the autonomous vehicle to non-drivable surface(s); a velocity, acceleration, and/or jerk associated with the candidate action; a short-term goal cost (e.g., displacement/progress along a route, parking, achieving a soft objective indicated by a teleoperations device—i.e., an objective that the autonomous vehicle is not required to meet but is factored into the cost determination to increase a likelihood of the autonomous vehicle operating in a particular manner), etc. In at least one example, a cost may be determined per action node and a total cost may be determined in association with the action node that includes a sum of the nodes composing a branch of the data structure comprising that action node (e.g., the cost of the action node and the cost of all parent nodes from which the action node depends, tracing back to the root node).

In at least one example, determining the cost may be further based on a cost to go, which may be a prediction of what the cost would be to move the autonomous vehicle in a particular manner (e.g., a steering rate, a steering angle, a velocity, acceleration) and/or to a particular position. For example, the cost to go may be an estimate that doesn't require running a simulation to determine a more exact prediction of a cost to go, thereby increasing the number of candidate actions that may be explored and/or reducing the computational resources consumed by the tree search. In some examples, the techniques discussed herein may comprise alternating using a lower estimate of the cost to go and using an upper estimate of the cost to go and/or alternating according to a ratio. For example, a first action node of a first layer may use the lower estimate and a second action node of a second layer, deeper than the first layer, may use the upper estimate. A ratio may set how many layers use the lower estimate to how many layers use the upper estimate— e.g., two layers using the lower estimate before switching to using the upper estimate for two layers, two layers using the lower estimate before switching to using the upper estimate for one layer, and/or the like. In at least one example, the lower estimate may be zero and the upper estimate may be a cost associated with a default action, such as maintaining a steering angle and/or velocity of the vehicle, going straight at a specified velocity, or the like. In some examples, the default action may be determined based at least in part on a track of the vehicle, perception data, and/or the like.

The techniques may additionally or alternatively comprise changing a status of a dynamic object from a reactive object to a passive object or vice versa based at least in part on a most-recent predicted state of the environment. For example, a predicted track of an object associated with the predicted state and/or a candidate action of a next layer may be provided as input to the machine-learned model of the agent filter discussed herein and the machine-learned model may classify the dynamic object as being reactive object or a passive object, which may differ from how the object was previously classified. In other words, the predicted actions of a dynamic object may cause the dynamic object to become far enough away from the autonomous vehicle and/or further candidate actions associated with the autonomous vehicle that the dynamic object is unlikely to change its behavior based on actions of the autonomous vehicle. Conversely, a dynamic object that was formerly too far away, faced in a particular direction, experiencing an environmental condition that prevented interaction with the autonomous vehicle (e.g., red stop light, not the dynamic object's turn at a stop), or the like may have prevented the dynamic object from being affected by actions by the autonomous vehicle but may now or in the future be likely to be affected. In a first example, determining the classification of a dynamic object may be executed in conjunction with determining a root node of the data structure and this classification may persist throughout each layer of the data structure. However, in another example, the classifications may be updated at each layer of prediction node(s) and/or every n number of layers, where n is a positive integer.

The techniques discussed herein may reduce the computational load for determining a path for controlling an autonomous vehicle, such as by conducting agent filtering (e.g., marking a dynamic object as a passive object or a reactive object), by alternating cost estimates instead of using simulation to determine a more exact cost, and/or by using a default control instruction to estimate an upper estimated cost instead of a more intensive technique for cost determination, such as simulation. The techniques may increase the number of candidate actions that may be explored and therefore the number of paths that may be explored in making a determination of how to control the autonomous vehicle, where a path may be sequential candidate actions that form a contiguous series. Increasing the number of explored candidate actions and/or paths may increase the granularity with which the autonomous vehicle can be controlled and may increase the number of scenarios that the autonomous vehicle can successfully and safely navigate.

EXAMPLE SCENARIO

FIG. 1 illustrates an example scenario 100 including a vehicle 102. In some examples, the example scenario 100 may be a real-world scenario and/or the example scenario 100 may be a representation of a real-world scenario modeled as a simulated scenario. In examples where the example scenario 100 is a simulated scenario, the example scenario 100 may be determined based at least in part on input received at a user interface of a computing device (e.g., a user of the computing device may define the environment, objects therein, and/or characteristics thereof) and/or the example scenario 100 may be based at least in part on log data received from one or more autonomous vehicles. The log data may be based at least in part on sensor data received at an autonomous vehicle, perception data generated by a perception component, and/or instructions generated by a planning component. In some examples, the autonomous vehicle may store the log data and/or periodically transmit the log data to a remote computing device.

In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle.

According to the techniques discussed herein and an example where scenario 100 is a real-world example, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, and/or other depth-sensing sensor), an image sensor (e.g., a camera), an audio sensor (e.g., a microphone), and/or environmental sensor (e.g., a barometer, a hygrometer, etc.). In some examples, a simulated sensor may correspond with at least one of the sensor(s) 104 on the vehicle 102 and in a simulation, one or more of sensor(s) 104 may be simulated. In some examples, the position of a simulated sensor may correspond with a relative position of one of the sensor(s) 104 to the vehicle 102.

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a perception component 110, a planning component 112, guidance system 114, and/or controller(s) 116. In some examples, the planning component 112 may comprise the guidance system 114. The perception component 110, the planning component 112, the guidance system 114, and/or the controller(s) 116 may include one or more machine-learned (ML) models and/or other computer-executable instructions. In general, the perception component 110 may determine what is in the environment surrounding the vehicle 102 and the planning component 112 may determine how to operate the vehicle 102 according to information received from the perception component 110. For example, the planning component 112 may determine trajectory 118 based at least in part on the perception data and/or other information such as, for example, one or more maps, localization information (e.g., where the vehicle 102 is in the environment relative to a map and/or features detected by the perception component 110), and/or a path generated by the guidance system 114. The trajectory 118 may be one of the candidate actions determined by the guidance system 114.

The trajectory 118 may comprise instructions for controller(s) 116 of the autonomous vehicle 102 to actuate drive components of the vehicle 102 to effectuate a steering angle and/or steering rate, which may result in a vehicle position, vehicle velocity, and/or vehicle acceleration that tracks the path generated by the guidance system. For example, the trajectory 118 may comprise a target heading, target steering angle, target steering rate, target position, target velocity, and/or target acceleration for the controller(s) to track as part of the path. For example, the coarse path generated by the guidance system 114 according to the techniques discussed herein may indicate vehicle positions, headings, velocities, and/or entry/exit curvatures at 500 millisecond time intervals and a smooth path output by the guidance system 114 may comprise such points at a 10 or 100 millisecond interval, which may correspond to a time interval associated with the trajectory 118. In some examples, the controller(s) may comprise software and/or hardware for actuating drive components of the vehicle 102 sufficient to track the trajectory 118 (and/or path, which may comprise multiple trajectories in one example).

In the example scenario 100, the autonomous vehicle 102 has received and/or determined a route 120 defining a start position 122, an end position 124, and a curve between the start position 122 and the end position 124 (note that the curve comprises a straight line and/or one or more curves). For example, the planning component 112 may have determined the route 120 based at least in part on sensor data and an end position received as part of a mission (e.g., from a passenger, from a command center). As used herein, references to a "position" may comprise both a location and/or a pose (e.g., position and/or orientation/heading of the vehicle). In some examples, the route may not comprise end position 124 and may additionally or alternatively comprise a target position, such as a target lane, target relative position (e.g., 10 feet from roadway edge), target object (e.g., follow vehicle, follow passenger, move toward an individual hailing the vehicle), etc.

As the vehicle operates to reach the end position 124, the autonomous vehicle 102 may encounter a scenario like example scenario 100 in which a planner that is reliant on a lane reference (e.g., a relative spatial designation determined based at least in part on a map and/or localizing the autonomous vehicle 102) to generate a path may not accurately and/or efficiently generate a path. For example, a variety of objects (e.g. a blocking vehicle 126, toolbox 128, and fallen traffic cone 130) cumulatively block all three lanes of the depicted roadway, which may cause another planner to stop the vehicle and/or call teleoperations because no one lane has sufficient room for the autonomous vehicle.

However, the guidance system 114 discussed herein may generate a path 132 based at least in part on environment data 134 generated from sensor data captured by sensor(s) 104. For example, the perception component 110 may generate all or part of environment data 134, which may comprise static data and/or dynamic data. For example, the static data may indicate a likelihood that an object exists at a location in the environment and the dynamic data may indicate a likelihood that an object occupies or will occupy a location in the environment. In some instances, the dynamic data may comprise multiple frames associated with different times steps at intervals up to a prediction horizon (i.e., a maximum time/distance for which dynamic data is predicted). In some examples, the guidance system 114 may always run, i.e., the guidance system may be the nominal planning component, or, in an alternate example, the guidance system 114 may be a contingent planning component or a planning component for special circumstances (e.g., when a nominal planning component isn't able to find a valid path).

The techniques discussed herein may additionally or alternatively comprise determining dynamic data based at least in part on a mode of operation of the vehicle. For example, the dynamic data may comprise a first prediction associated with a first vehicle mode and a first time and a second prediction associated with a second vehicle mode and the first time. The vehicle modes may include mission-level modes, such as passenger pickup, passenger transit, passenger drop-off, or the like; path or trajectory-level modes such as maintaining trajectory, slowing to a stop, transitioning lanes, executing a right hand turn, or the like; and/or signal modes, such as activating a speaker, activating a turn light, flashing headlights or high beams, or the like. The autonomous vehicle's behavior and signals may affect decisions and behavior made by other entities in the vicinity of the autonomous vehicle 102 and may thereby affect the predicted motion of other objects.

In some examples, the perception component 110 may receive sensor data from the sensor(s) 104 and determine data related to objects in the vicinity of the vehicle 102, such as the static and/or dynamic data. The depicted example of the environment data 134 comprising static and/or dynamic data is a top-down representation of such data, but any representation of the static and/or dynamic data is contemplated, such as a heat map, object classifications associated with detected objects, instance segmentation(s), semantic segmentation(s), two and/or three-dimensional bounding boxes, tracks, etc. The perception component 110 may additionally or alternatively determine route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), track data (e.g., the environment representations, object detections, and/or tracks discussed herein), etc.

In some examples, the perception component 110 may receive sensor data from the sensor(s) 104 and determine data related to objects in the vicinity of the vehicle 102, such as the static and/or dynamic data. The depicted example of the environment data 134 comprising static and/or dynamic data is a top-down representation of such data, but any representation of the static and/or dynamic data is contemplated, such as a heat map, object classifications associated with detected objects, instance segmentation(s), semantic segmentation(s), two and/or three-dimensional bounding boxes, tracks, etc. The perception component 110 may additionally or alternatively determine route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), track data (e.g., the environment representations, object detections, and/or tracks discussed herein), etc.

In some examples, the perception component 110 may comprise a pipeline of hardware and/or software, which may include one or more GPU(s), ML model(s), Kalman filter(s), and/or the like. In some examples, the perception component 110 may monitor as much of the environment surrounding the autonomous vehicle as possible, which may be limited by sensor capabilities, object and/or environmental occlusions (e.g., buildings, elevation changes, objects in front of other objects), and/or environmental effects such as fog, snow, and/or the like. For example, the sensor data may comprise radar data, which the perception component 110 may receive as input. The perception component 110 may be configured to detect as many objects and information about the environment as possible to avoid failing to account for an event or object behavior that should be taken into account by the planning component 112 in determining the trajectory 118.

The object classifications, which may be part of the environment data 134 and determined by the perception component 110, may distinguish between different object types such as, for example, a passenger vehicle, a pedestrian, a bicyclist, a delivery truck, a semi-truck, traffic signage, and/or the like. A track may comprise a historical, current, and/or predicted object position, velocity, acceleration, and/or heading. In some examples, the perception component 110 may comprise a prediction component that may determine the predicted portion of the track, which may comprise a predicted position, heading, steering rate, velocity, acceleration, classification (for those classifications that are malleable, such as cyclists that may become pedestrians), etc. The prediction component may comprise a simulation component, machine-learned model, or in additional or alternate examples, the prediction component may comprise a Kalman filter or the like. The perception component 110 may be used to determine the environment state indicated by a prediction node as part of the tree search discussed herein. For example, the environment state may comprise current and/or predicted environment data 134.

The data produced by the perception component 110 may be collectively referred to as perception data. Once/as the perception component 110 generates perception data, the perception component 110 may provide the perception data to the planning component 112 and/or the guidance system 114. In some examples, perception data may comprise outputs of sensor specific pipelines (e.g., vision, lidar, radar) and/or hybrid sensor pipelines (e.g. vision-lidar, radar-lidar).

The planning component 112 may use the perception data received from perception component 110 and/or a path received from the guidance system 114, to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). For example, the planning component 112 may determine a route for the vehicle 102 from a first location to a second location; determine a smooth trajectory from a coarse trajectory received from the guidance system 114; generate, substantially simultaneously and based at least in part on the path and perception data and/or simulated perception data (which may further include predictions regarding detected objects in such data), a plurality of potential trajectories for controlling motion of the vehicle 102 in accordance with a receding horizon technique (e.g., 1 micro-second, half a second, 2 seconds, 5 seconds, 10 seconds, or any other near-term time period) to control the vehicle to traverse the route (e.g., in order to avoid any of the detected objects); and select one of the potential trajectories as a trajectory 118 of the vehicle 102 that may be used to generate a drive control signal that may be transmitted to the controller(s) 116 for actuating drive components of the vehicle 102. FIG. 1 depicts an example of such a trajectory 118, represented as an arrow indicating a target heading, target steering angle, target steering rate, target position, target velocity, and/or target acceleration for the controller(s) to track, although the trajectory itself may comprise instructions for controller(s), which may, in turn, actuate a drive system of the vehicle 102.

In some examples, the guidance system 114 may be a secondary guidance system to a nominal guidance system of the planning component 112. In some examples, the planning component 112 may generate the one or more candidate actions for the tree search discussed herein and associated with action node(s). The planning component 112 may receive a trajectory or path from the nominal guidance system and may receive the path generated by the guidance system 114 as discussed herein. That path received from the guidance system 114 may be treated by the planning component 112 as a contingent path—for example, the planning component 112 may rely on an output of the nominal guidance system of the planning component 112 unless or until the output of the nominal guidance system would cause the vehicle 102 to stop or call teleoperations or fails to output a feasible, impact-free, and/or economical path or trajectory. In such an instance, the planning component 112 may switch to using the path output by the guidance system 114. In additional or alternate examples, the planning component 112 may use the path output by the guidance system 114 to generate a trajectory all the time, in certain regions (e.g., in areas with no lane references), based at least in part on sensor data and/or perception data, or the like. In some examples, the guidance system 114 may execute the tree search discussed herein, which may include managing generation of the action node(s) (e.g., by sending requests to an application programming interface (API) associated with the planning component 112 and receiving candidate action(s) in response), and/or managing generation of the prediction nodes (e.g., by sending requests to an API associated with a prediction component of the perception component 110 and receiving current and/or predicted environment state data), etc.

The guidance system 114 may comprise one or more GPUs or may be communicatively coupled with one or more GPUs (e.g., via a publish-subscribe messaging system, via a data bus) and the techniques discussed herein may be parallelized and disseminated to threads of the GPUs, although it is contemplated that the techniques discussed herein may comprise at least portions that are serial.

EXAMPLE SYSTEM

Figure 2:
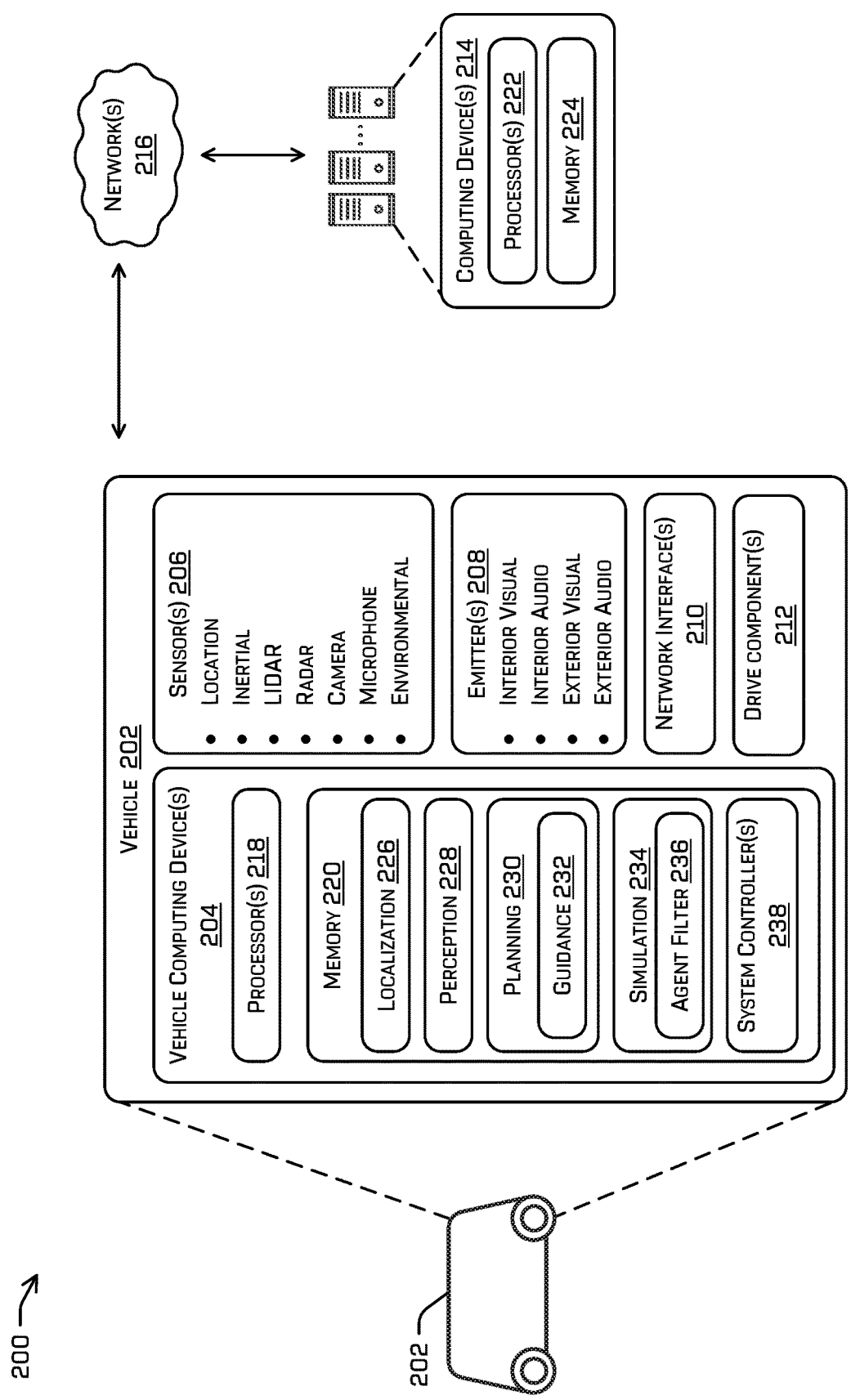
FIG. 2 illustrates a block diagram of an example autonomous vehicle architecture comprising a guidance system for unstructured path planning.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 106 and sensor(s) 206 may represent sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214. The position associated with a simulated sensor, as discussed herein, may correspond with a position and/or point of origination of a field of view of a sensor (e.g., a focal point) relative the vehicle 202 and/or a direction of motion of the vehicle 202.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface(s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 108. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, planning component 230, guidance component 232, simulation component 234, agent filter 236, and/or system controller(s) 238—zero or more portions of any of which may be hardware, such as GPU(s), CPU(s), and/or other processing units. Perception component 228 may represent perception component 110, planning component 230 may represent planning component 112, and guidance component 232 may represent guidance system 114.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) of an environment and can continuously determine a location, velocity, and/or orientation of the autonomous vehicle within the map(s). In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 226 may provide data to various components of the vehicle 202 to determine an initial position of an autonomous vehicle for generating a trajectory and/or for generating map data, as discussed herein. In some examples, localization component 226 may provide, to the perception component 228, a location and/or orientation of the vehicle 202 relative to the environment and/or sensor data associated therewith.

In some instances, perception component 228 may comprise a primary perception system and/or a prediction system implemented in hardware and/or software. For example, the prediction component may be the simulation component 234 although, in an additional or alternate example, the prediction component and the simulation component 234 may be separate components. Regardless, the perception component 228 (and the prediction component thereof and/or simulation component 234) may work in concert with the guidance component 232 to determine the environment state discussed herein. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. The perception component 228 may include a prediction component that predicts actions/states of dynamic components of the environment, such as moving objects. In some examples, the perception component 228 may include the simulation component 234 as part of the prediction portion of the perception component 228. Data determined by the perception component 228 is referred to as perception data. Although the agent filter 236 is depicted as being part of the simulation component 234, in an additional or alternate example, the perception component 228 may include the agent filter 236.

The planning component 230 may receive a location and/or orientation of the vehicle 202 from the localization component 226 and/or perception data from the perception component 228 and may determine instructions for controlling operation of the vehicle 202 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic, such as may be generated by system controller(s) of the drive component(s) 212)) that the drive component(s) 212 may parse/cause to be carried out, second instructions for the emitter(s) 208 may be formatted according to a second format associated therewith). In some examples, where the planning component 230 may comprise hardware/software-in-a-loop in a simulation (e.g., for testing and/or training the planning component 230), the planning component 230 may generate instructions which may be used to control a simulated vehicle. These instructions may additionally or alternatively be used to control motion of a real-world version of the vehicle 202, e.g., in instances where the vehicle 202 runs the simulation runs on vehicle during operation.

The planning component 230 may be a primary component for determining control instructions for the vehicle 202, such as during operation of the vehicle 202 in nominal conditions; however, the planning component 230 may further comprise and/or the vehicle 202 may additionally comprise separately from the planning component 230 a guidance component 232. Guidance component 232 may determine a trajectory and/or path for controlling the vehicle contemporaneously with the planning component 230, such as to determine a contingent trajectory and/or path for controlling the vehicle 202 when a trajectory determined by the planning component 230 fails to be generated (e.g., the planning component 230 can't determine a suitable trajectory that avoids objects) and/or that violates a comfort metric, such as a threshold acceleration and/or jerk, or a rule of the road. The guidance component 232 may execute the tree search discussed herein and may manage determining the action node(s) and/or prediction node(s) of the tree search by transmitting a request for the planning component to generate candidate action(s) based at least in part on an environment determined in association with a prediction node. The guidance component 232 may receive an initial state of the environment from the perception component 228 (i.e., in association with a root node of the tree search)—the guidance component 232 may transmit this initial environment state to the planning component 230 and may receive one or more candidate actions from the planning component 230. The guidance component 232 may transmit at least one of these one or more candidate actions to the simulation component 234 and/or a prediction component of the perception component 228, which may determine a predicted state of the environment that is based at least in part on the candidate action. This process may be iterated until a time horizon, distance, progress along a route, target position, and/or suitable path is reached/determined.

For example, the time horizon may be a length of time into the future from a current time (e.g., 500 milliseconds, 1 second, 2, seconds, 5 seconds, 8 seconds, 10 seconds). This length of time may be associated with controlling the vehicle for the next m units of time, where m is a positive integer. A distance may define a total distance covered by the constituent actions that make up a path, whereas progress along a route may be the displacement along/with reference to a route. In an additional or alternate example, a target position may be used to terminate the tree search. For example, upon determining a path that reaches the target position in the environment, the tree search may output that path and terminate. In an additional or alternate example where the guidance system is used when a nominal planning component failed to create a valid trajectory or path, the guidance system may terminate upon determining a valid path (e.g., a path that is impact-free and conforms to a rule set, which may specify comfort metrics, conformance to laws, etc.). In additional examples, iterations may continue until an objective is achieved (e.g., a successful lane change, a successful merge, or any other completed action). In any one or more examples, any combination of the above may further be used as decision points for branching the tree.

The simulation component 234 may operate on the vehicle 202 and/or on the computing device(s) 214. The simulation component 234 may determine a simulation of the environment and/or the vehicle 202, such as simulating execution of a candidate action by the vehicle 202 and a predicted state of the environment based at least in part on the passage of time and responsive to execution of the candidate action by the vehicle 202. For example, the simulation may comprise a representation of a position, orientation, movement, and/or quality of portions of the environment and/or the vehicle 202. The environment may comprise an agent, such as another vehicle, a pedestrian, vegetation, a building, signage, and/or the like.

The simulation component 234 may receive a candidate action and an environment state (which may be a current environment state determined by the perception component 228 or a predicted environment state determined by a prediction component of the perception component 228 or by the simulation component 234) from the guidance component 232 to determine the simulation data, which may be a two or three-dimensional representation of the scenario. The simulation data may be used to instantiate and execute a simulation. The candidate action may be used to control motion of a simulation of the vehicle 202 during execution of the simulation. A three-dimensional representation may comprise position, orientation, geometric data (e.g., a polygon representation, a digital wire mesh representation) and/or movement data associated with one or more objects of the environment and/or may include material, lighting, and/or lighting data, although in other examples this data may be left out. In an additional or alternate examples, the simulation component 234 may comprise a computational construct (e.g., an algorithmic and/or mathematical representation used by a computing device in performing the operations described that is not intended to be (and/or incapable of being) visualized).

The scenario data may comprise a two-dimensional representation of an environment associated with a scenario, objects contained therein, and characteristics associated therewith, all of which may be part of a scenario associated with the log data. For example, the scenario data may identify a position of an object, an area occupied by the object, a velocity and/or acceleration associated with the object, whether the object is static or dynamic, an object type associated with the object (e.g., a classification such as "pedestrian," "bicyclist," "vehicle," "oversized vehicle," "traffic light," "traffic signage," "building," "roadway," "crosswalk, "sidewalk"), and/or other kinematic qualities associated with the object and/or the object type (e.g., a friction coefficient, an elasticity, a malleability). As regards the environment itself, the scenario data may identify a topology of the environment, weather conditions associated with the environment, a lighting state (e.g., sunny, cloudy, night), a location of light sources, and/or the like. In some examples, topology, fixed object (e.g., buildings, trees, signage) locations and dimensions, and/or the like associated with the scenario data may be generated based at least in part on map(s). In some examples, the scenario data may be used (e.g., by the simulation component 234) to instantiate a three-dimensional representation of the object and/or the simulated environment may be instantiated based at least in part on map data (e.g., which may define a topology of the environment; the location and/or dimensions of fixtures such as signage, plants, and/or buildings) and/or the scenario data.

Additionally or alternatively, the simulation may include a simulated object that is controlled by an agent behavior model as discussed in more detail in U.S. patent application Ser. No. 16/889,747, filed Jun. 1, 2020, the entirety of which is incorporated by reference herein, in addition to or instead of a nominal prediction component of the simulation component or a prediction component of the perception component 110. The agent behavior model may control simulated motion of a simulated representation of a dynamic object, such as a reactive dynamic object. In some examples, the simulation may be executed as part of a forecasting/prediction operation, so one or more simulations may be executed to determine a prospective scenario (e.g., predicted environment state data) based on a candidate action generated according to the tree search discussed herein.

In some examples, a simulated sensor may determine simulated sensor data based at least in part on a simulation executed by the simulation component 234. For example, U.S. patent application Ser. No. 16/581,632, filed Sep. 24, 2019 and the entirety of which is incorporated by reference herein, discusses this in more detail. In an additional or alternate example, the simulation executed by the simulation component may itself comprise simulated sensor data. The perception component 228 (e.g., a copy thereof, which may comprise software and/or hardware, which may include hardware-in-the loop simulation) may receive such sensor data and/or simulated sensor data may output perception data that is provided as input to the planning component 230. The planning component may use the perception data to determine instructions for controlling motion of the vehicle 202, which may be used to control at least the simulated representation of the vehicle 202 in the simulation and, in some examples, may be additionally used to control real-world motion of the vehicle 202, such as in examples wherein the simulation component 234 executes on-vehicle during real-world operation.

In some examples, the simulation component 234 may additionally or alternatively store a ruleset and may determine whether a candidate action passed or failed a scenario based at least in part on the ruleset. The ruleset may be associated with and/or include operating constraint(s). In some examples, the ruleset may be part of or replaced by an event detection system (U.S. patent application Ser. No. 16/682,971, filed Nov. 13, 2019, the entirety of which is incorporated by reference herein) and/or a impact monitoring system (U.S. patent application Ser. No. 16/703,625, filed Dec. 4, 2019).

The simulation component 234 may comprise an agent filter 236 that may comprise a machine-learned model trained to classify dynamic objects detected by the perception component 228 as being reactive or passive. In at least one example, the classification need not be binary and may be a score, such as a number between 0 and 1, where 0 indicates that an object is passive and a 1 indicates that an object is reactive. In some examples, the agent filter 236 may receive a track associated with a dynamic object and a candidate action of the vehicle as input and may determine whether the dynamic object is passive or reactive according to a binary classification or a regression, as discussed above. A purely passive agent will not change its behavior at all based on the behavior of the vehicle 202/the candidate action, whereas an action taken by a reactive object is highly likely to be affected by action(s) of the vehicle 202. In an additional or alternate example, the agent filter 236 may determine a likelihood (e.g., a covariance, a posterior probability) that a dynamic object will modify an action associated therewith based on an action of the vehicle 202. Dynamic objects associated with a likelihood meeting or exceeding a threshold likelihood may be classified as being reactive, whereas another dynamic object associated with a likelihood that doesn't meet the threshold may be classified as a passive object.

In some examples, training the agent filter 236 may comprise receiving log data from the vehicle, which may include perception data and trajectory(ies) implemented by the vehicle. The perception data may identify a dynamic object and/or data related thereto, such as a track associated with the dynamic object. To identify a label or yielding score identifying that a dynamic object was reactive to the vehicle's actions, a computing device may determine a correlation score based on changes in the dynamic object track over time relative to the trajectory implemented by the vehicle. In some examples, a filter may be applied to the dynamic objects in the log data to restrict out dynamic objects that are unlikely to be modifying their behavior based on the vehicle's behavior. For example, the filter may remove dynamic objects that are located at a distance from the vehicle greater than a threshold distance (based on the dynamic objects speed, in some instances), a heading of the dynamic obj et, and/or the like.

The predicted state of the environment may be determined by a prediction component of the perception component 228 and/or the simulation component 234 based at least in part on whether any dynamic object(s) in the environment are classified as being reactive. A predicted state of a reactive object may be simulated by the simulation component 234 whereas a predicted state of a passive object may be determined by a prediction component of the perception component 228, such as a Kalman filter for such predictions or other simple propagation of a current state of the passive object (e.g., dead reckoning). The passive object prediction component may use less compute, whereas the dynamic object prediction component (e.g., the simulation component 234) may, in some instances, require more compute.

The memory 220 and/or 224 may additionally or alternatively store a mapping system, a planning system, a ride management system, etc. Although perception component 228, planning component 230, and/or simulation component 234 are illustrated as being stored in memory 220 and/or 224, perception component 228, planning component 230, guidance component 232, simulation component 234, and/or agent filter 236 may include processor-executable instructions, machine-learned model(s) (e.g., a neural network), and/or hardware.

As described herein, the localization component 226, the perception component 228, the planning component 230, guidance component 232, simulation component 234, the agent filter 236, and/or other components of the system 200 may comprise one or more ML models. For example, localization component 226, the perception component 228, the planning component 230, guidance component 232, simulation component 234, and/or the agent filter 236 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, the entirety of which is incorporated by reference herein), and/or VoxelNet. Architecture latency optimizations may include MobilenetV2, Shufflenet, Channelnet, Peleenet, and/or the like. The ML model may comprise a residual block such as Pixor, in some examples.

Memory 220 may additionally or alternatively store one or more system controller(s) (which may be a portion of the drive component(s)), which may be configured to control steering, propulsion, braking, safety, emitters, communication, and other systems of the vehicle 202. These system controller(s) may communicate with and/or control corresponding systems of the drive component(s) 212 and/or other components of the vehicle 202. For example, the planning component 230 may generate instructions based at least in part on perception data generated by the perception component 228 and/or simulated perception data and transmit the instructions to the system controller(s), which may control operation of the vehicle 202 based at least in part on the instructions.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

EXAMPLE PATH GENERATION USING A TREE SEARCH AND/OR AGENT FILTER

Figure 3A:
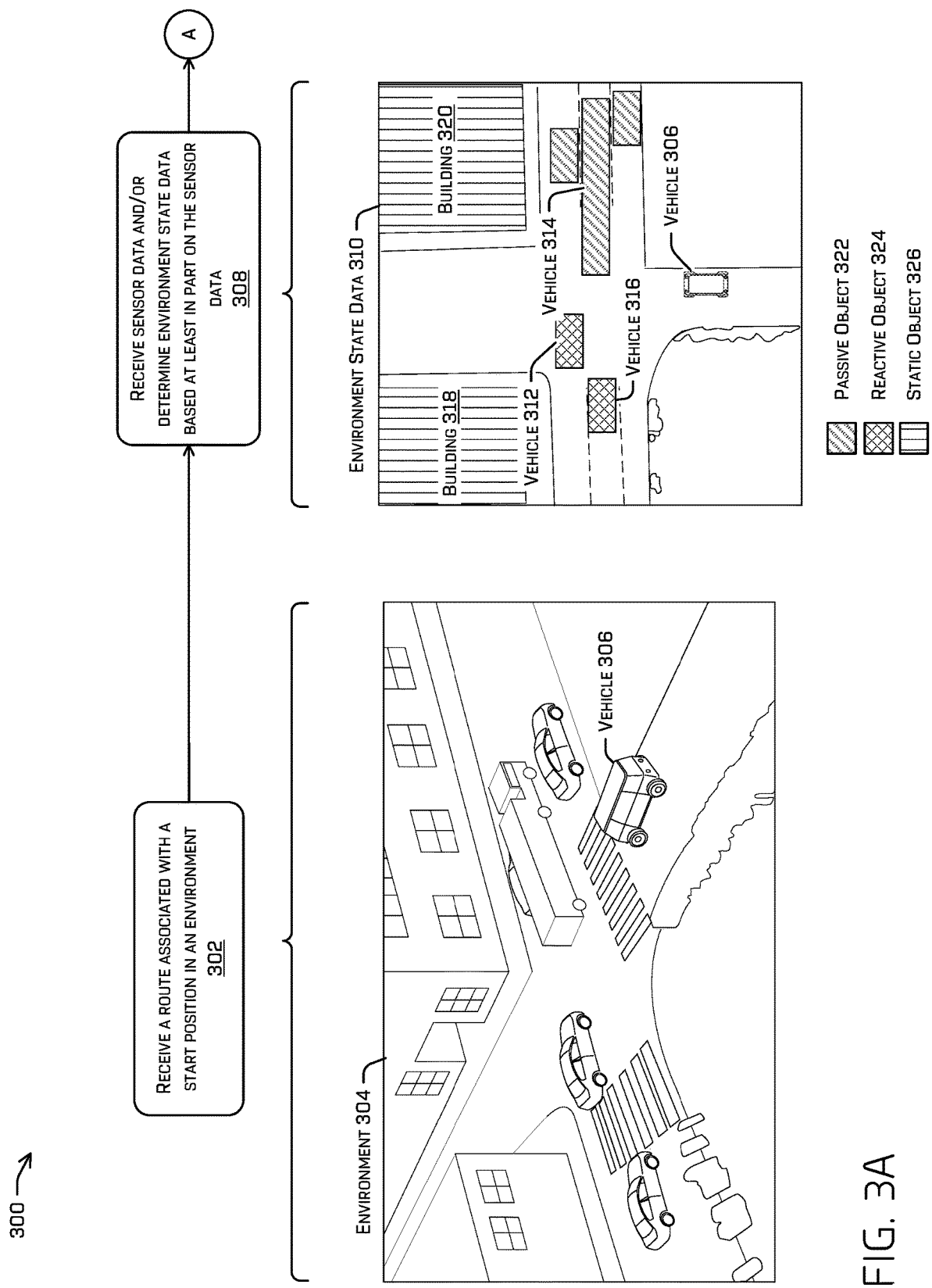
FIGS. 3A-3C illustrate a pictorial flow diagram of an example process for generating a path for controlling an autonomous vehicle using an agent filter and/or a tree search that employs an alternating estimated cost, which may be generated from sensor data, and may comprise an occupancy map indicating static objects, and/or a dynamic object predicted position and/or velocity probability map.
Figure 3B:
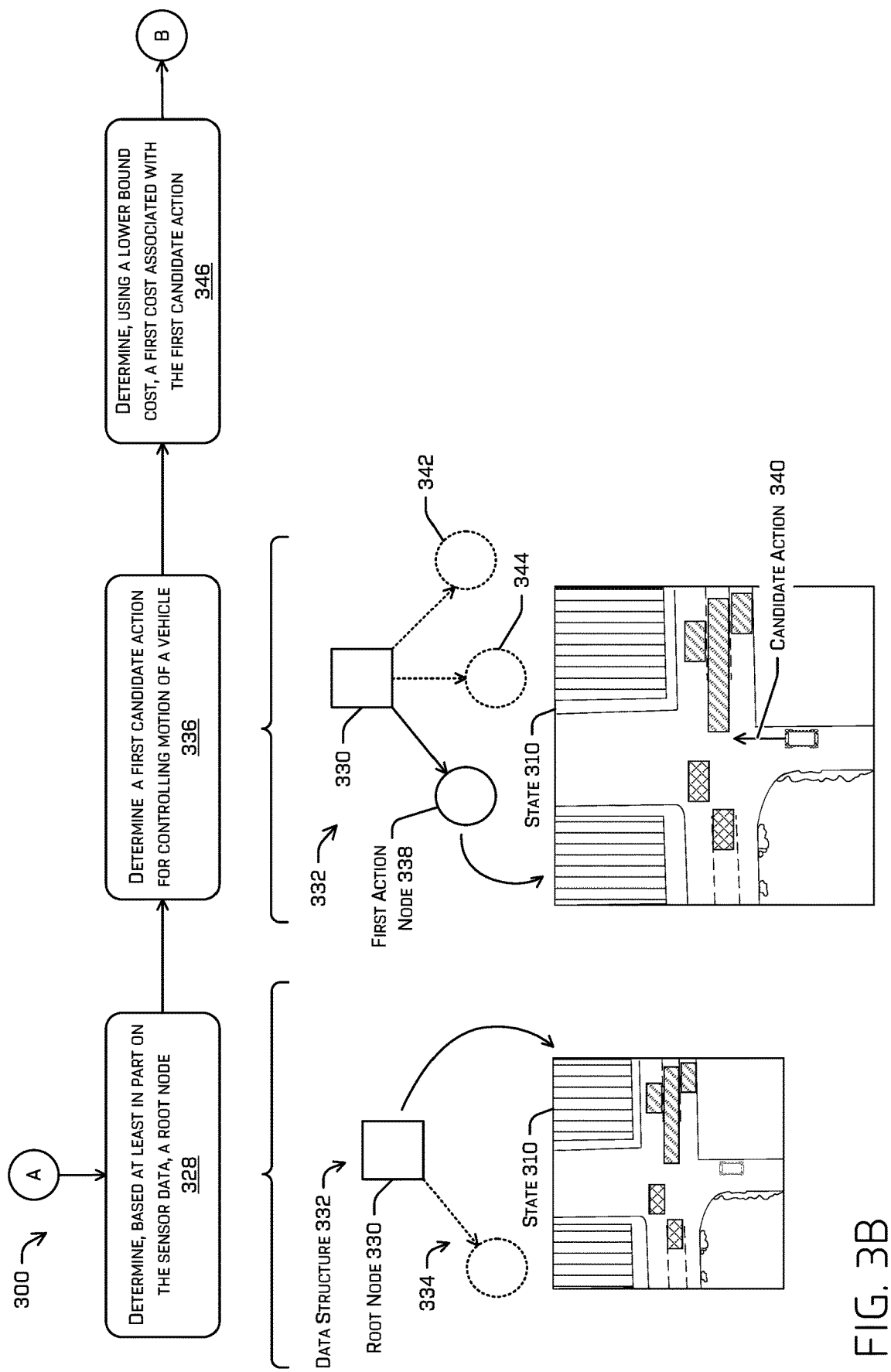
Figure 3C:
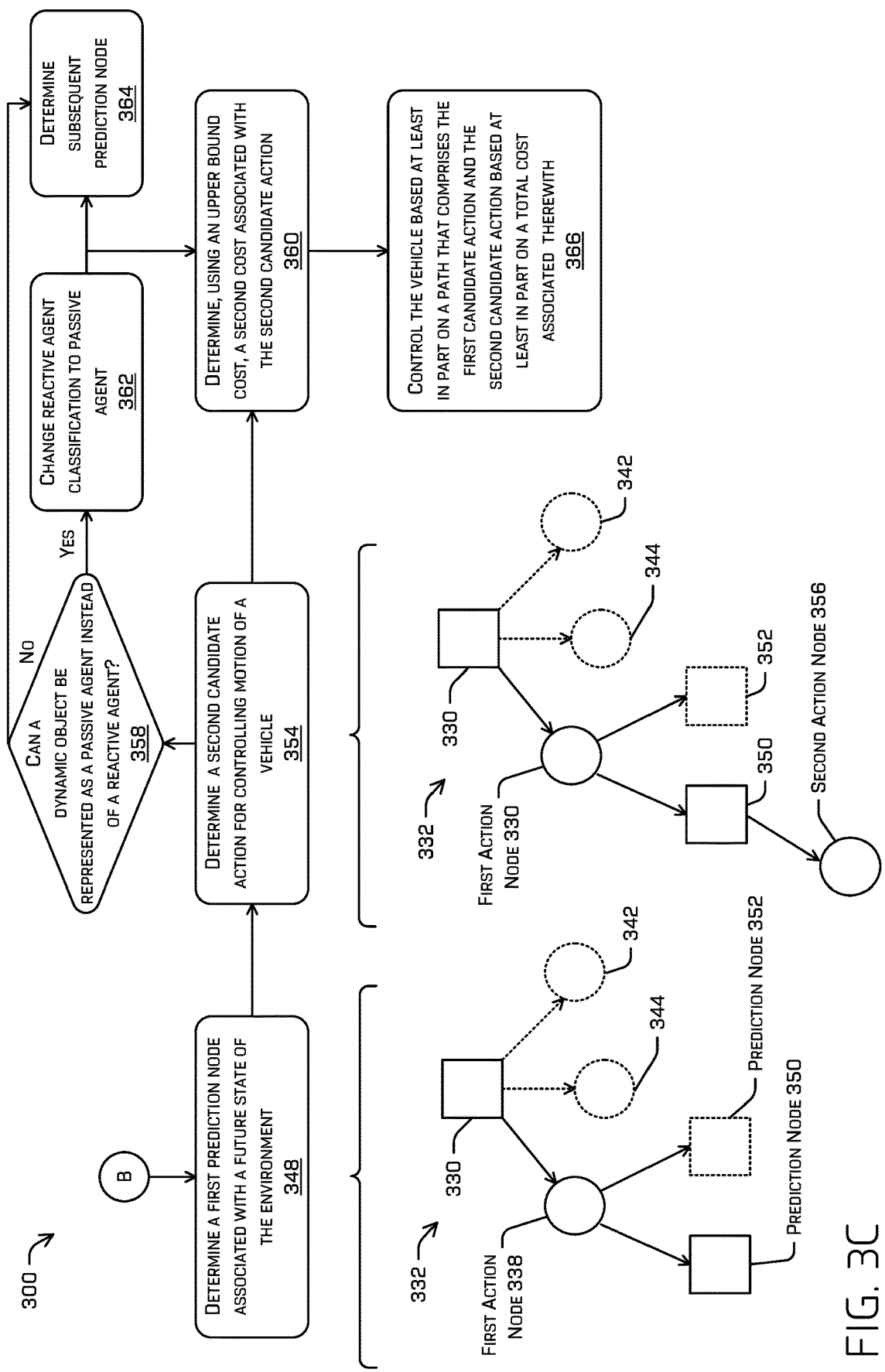

FIGS. 3A-3C illustrate a pictorial flow diagram of an example process 300 for generating a path for controlling a vehicle (e.g., vehicle 202) using an agent filter and/or a tree search that employs an alternating estimated cost, which may be determined based at least in part on sensor data and/or perception data, and may comprise an occupancy map indicating static objects and/or a dynamic object predicted position and/or velocity probability map. In some examples, example process 300 may be executed by a guidance component (e.g., guidance component 232) of the autonomous vehicle although, in at least some examples, example process 300 may be additionally or alternatively executed by a planning component, simulation component, perception component, and/or prediction component of the autonomous vehicle. In the latter example, the guidance component may coordinate operations of the various components, such as by transmitting API requests to APIs associated with each of the components and using the API responses to execute the tree search discussed herein. In another example, the guidance component may coordinate the operations of the component(s) using messages transmitted over a publish-subscribe network to/from the various components. In some examples, the tree search conducted by the guidance component may include executing a Monte-Carlo tree search (MCTS); partially observable Monte-Carlo planning (POMCP); Markov decision process (MDP), such as a partially observable MDP (POMDP); or the like improved with the techniques discussed herein, including agent filtering, upper/lower bound cost estimations, and/or defaulting to a default policy.

At operation 302, example process 300 may comprise receiving a route associated with at least a start position in an environment, according to any of the techniques discussed herein. FIG. 3A depicts an environment 304 in which a vehicle 306 is located that is executing example process 300. The start position may be associated with a current position of the vehicle 306 and the route may specify an end position and may, in some examples, include intervening targets or operations, such as exiting a freeway, seeking to stay in a particular lane, targeting parking on a particular block (but not a particular position, although in some examples, a particular portion of the block may be identified), etc.

At operation 308, example process 300 may comprise receiving sensor data from one or more sensors, according to any of the techniques discussed herein. The sensor(s) may be associated with the vehicle and/or another computing device. Operation 308 may additionally or alternatively comprise determining environment state data based at least in part on the sensor data. In some examples, the perception component may determine the environment state data 310 (abbreviated "state 310" in the figures for space) and, for any dynamic objects detected by the perception component, the agent filter may determine whether the dynamic object is reactive or passive (or a score associated therewith, as discussed above). The environment state data 310 may be associated with a most recently received set of sensor data (e.g., a current time, although there may be a small delay between receiving the sensor data and determining the perception data).

To further illustrate, the environment state data 310 may comprise a position, orientation, and/or characteristics of the vehicle 306 in the environment, which may correspond to real-time operation of an autonomous vehicle. The environment state data 310 may additionally or alternatively comprise an indication of an object type associated with one or more objects (e.g., passenger vehicle 312, oversized vehicle 314, passenger vehicle 316, building 318, building 320) and/or characteristics associated with the one or more objects (e.g., a position, velocity, acceleration, heading, material type, kinematic coefficient). Note that the environment state data 310 is represented as a two-dimensional image, although, in additional or alternate examples, the environment state data 310 may comprise a data structure, such as a pub-sub message, a three-dimensional representation, and/or the like. In some examples, the environment state data 310 may further comprise a prediction of whether an occluded object exists, as discussed in more detail in U.S. patent application Ser. No. 16/407,139, filed May 8, 2019, the entirety of which is incorporated by reference herein, or similar thereto. In an additional or alternate example, the prediction of whether an occluded object exists may be determined by a machine-learned model that receives the environment state data as input and outputs a field of likelihoods. Any region of the environment associated with a likelihood that meets or exceeds a threshold may be output as a potential false negative, which may be used as part of the candidate action generation.

The environment state data may comprise an object classified by the perception component as being dynamic. For example, a dynamic object, which may also be referred to herein as an agent, may comprise a vehicle, a bicyclist, pedestrian, a ball, a wind-blown plastic bag, and/or any other moveable object or object that is likely to move within a time period. An object such as a bench or table may be moveable but, in a time period relevant to operation of the vehicle, is unlikely to move and may be considered a static object. The environment state data 310 may include dynamic object(s) and may include a dynamic object classification and/or likelihood determined by the agent filter in association with a dynamic object. For example, the classification may include whether a dynamic object is passive or reactive and/or a likelihood thereof. As discussed above, the agent filter may comprise an ML model trained to receive an object track associated with a dynamic object, a current state of the vehicle and/or a candidate action as discussed further herein, and/or sensor data associated with the dynamic object and determine, by a neural network or any of the other ML techniques discussed above, a classification and/or a confidence score (e.g., a posterior probability, a likelihood) that a dynamic object is passive or reactive. In some examples, if the confidence score determined by the ML model meets or exceeds a confidence threshold, the detected object may be classified as a reactive object; otherwise, the detected object may be classified as a passive object. In yet another example the ML model may additionally or alternatively output, from a last layer, the classification itself in addition to or instead of the confidence score.

A passive object may be a dynamic object that is unlikely (e.g., having a confidence score below a confidence score threshold) to change its behavior and/or depend its behavior, at least in part, upon an action of the vehicle 306, whereas a reactive object may be a dynamic object that is likely to change its behavior based on an action of the vehicle 306. Passive objects are indicated in the figures using the crosshatching depicted at 322. Reactive objects are indicated in the figures using the crosshatching depicted at 324. Static objects are indicated in the figures using the crosshatching depicted at 326. Note that, in FIG. 3A, traffic is moving to the right, so oversized vehicle 314, for example, has already substantially passed vehicle 306 and therefore may be unlikely to change actions taken thereby based on actions of the vehicle 306. Whereas vehicles 312 and 316 have yet to pass vehicle 306 and may be significantly more likely to base their actions, at least in part, on an action of the vehicle 306.

Turning to FIG. 3B, at operation 328, example process 300 may comprise determining, based at least in part on the sensor data, a root node 330 of the tree search, according to any of the techniques discussed herein. In some examples, determining the root node may comprise determining a data structure 332 for the tree search, which may comprise setting up and storing a directed acyclical graph (DAG); upper confidence bounds applied to trees (UCT); determinized sparse partially observable tree (DESPOT); or the like for modeling control states and environment states. The root node may be associated with a current time and/or the most recent sensor data or batch of sensor data. As such, the root node may be associated with perception data that may or may not include prediction data. In other words, the root node may identify environment state data that includes a current position, orientation, velocity, acceleration, classification, etc. of static and/or dynamic objects (including similar information for the vehicle, which may be generated by the localization component of the vehicle) in the environment and may additionally or alternatively include historical data of the same.

Predictions of how the object(s) will behave in the future, correspondingly how this data will change in the future, may be associated with the prediction node(s) discussed herein and, in some examples, the prediction data for a current time step may be associated with the root node. In other words, the root node may include the current state of the environment, including the object(s) therein, localization data related to the vehicle (e.g., determined by SLAM), and/or prediction data identifying one or more possible future states of the environment, which may include a position, orientation, velocity, acceleration, classification, etc. of an object associated with a future time.

Figure 6A:
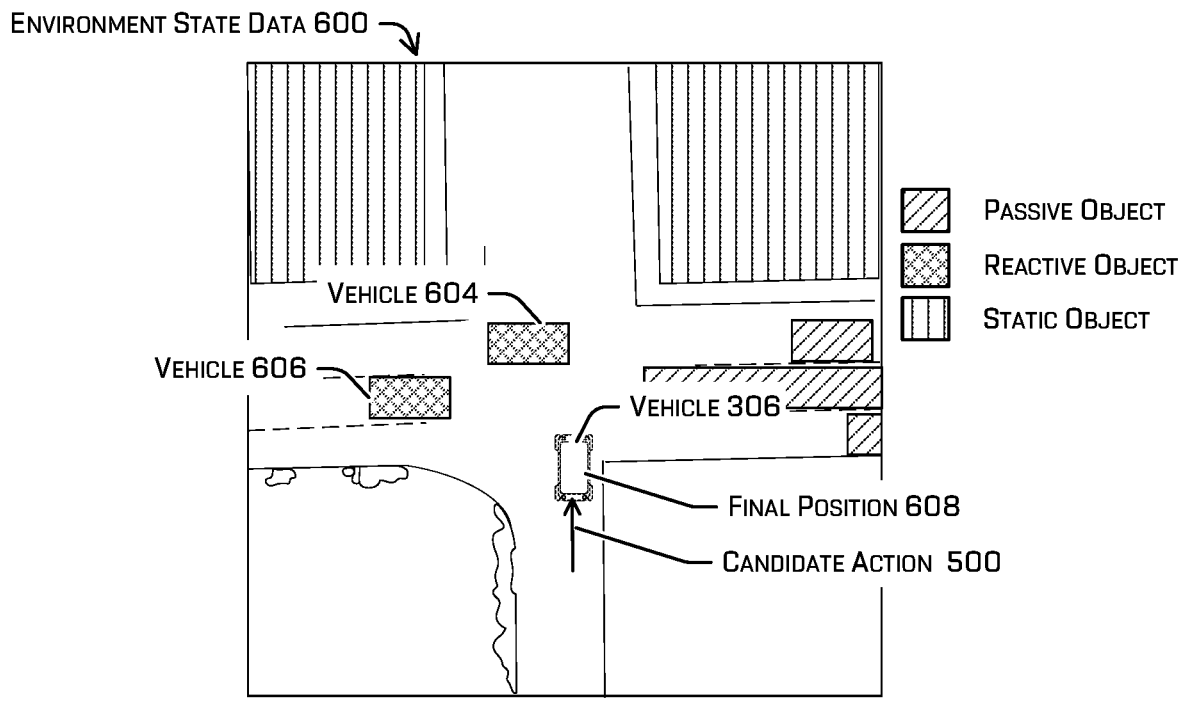
FIGS. 6A and 6B illustrate a top-down illustration of two different predicted environment states associated with a single prediction node or two different prediction nodes that may be determined based at least in part on the candidate action depicted in FIG. 5A.
Figure 6B:
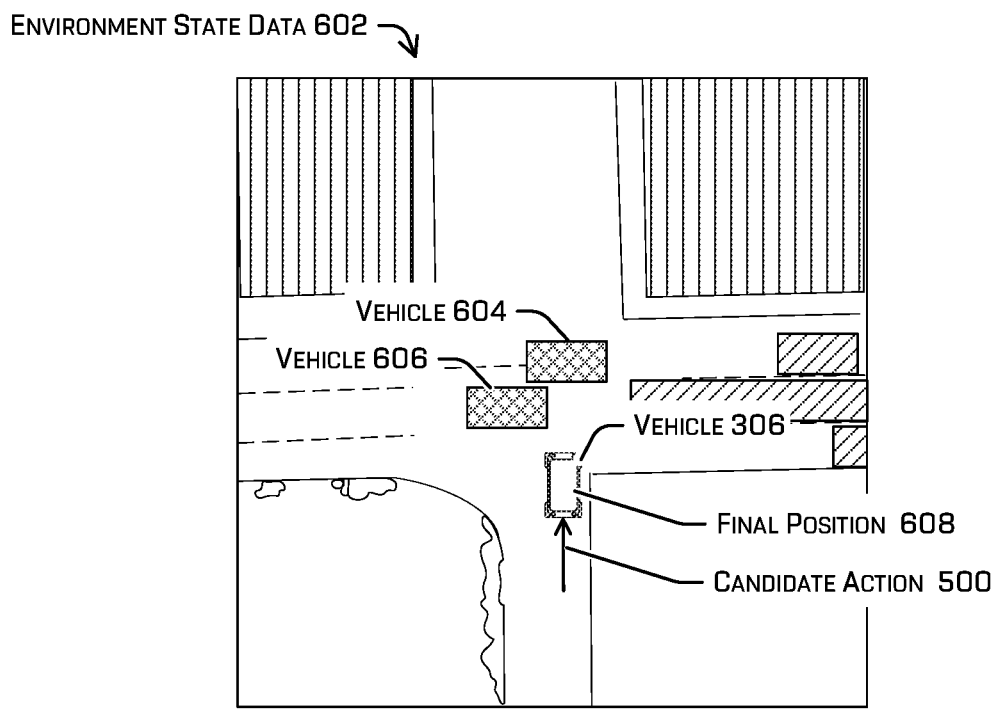

The figures depict prediction nodes (and the root node, which may be a prediction node) as squares, and action nodes as circles. The dashed line and circle 334 represent the relationship between the root node 330 and an as-of-yet undiscovered/undetermined action node that is based on the root node 330. The root node 330 may identify the environment state data 310 and one or more predicted environment scenarios. For simplicity only the current environment state data is displayed in FIGS. 3A-3C for the sake of space, although predicted environment state data may additionally be associated with the root node 330, such as the predicted environment states as depicted in FIGS. 6A and 6B.

At operation 336, example process 300 may comprise determining a first candidate action for controlling motion of the vehicle (based at least in part on a previous prediction node), according to any of the techniques discussed herein. The candidate action determined at operation 336 may be determined based at least in part on a prediction node of a most recently determined layer of prediction nodes. For example, FIG. 3B depicts only the first layer of prediction nodes, which only includes the root node 330. FIG. 3C depicts a second layer of prediction nodes, which includes prediction nodes 350 and 352. Determining the first candidate action may include providing to the planning component environment state data associated with a prediction node upon which the candidate action is based. For example, first action node 338 may be indicate one or more candidate actions that are based on environment state data indicated by the root node 330. FIG. 3B depicts one such candidate action, candidate action 340, which comprises controlling the vehicle to move straight forward.

The environment state data may be current environment state data (if the prediction node is the root node) or predicted environment state data associated, as discussed above. Regardless, determining the first candidate action at the planning component may comprise a nominal method of trajectory planning. In an additional or alternate example, determining the candidate action based at least in part on the environment data may include a trajectory determination system separate from the nominal trajectory generation system of the planning component. This separate system may determine a candidate action based at least in part on a lane reference type, a target type, an expansion variable, an offset, a multiplier, and/or a propensity type. This is also discussed in further detail in FIGS. 8A and 8B.

The lane reference type may be an indication of whether a lane reference for generating the candidate action should be generated using sensor data or using a predefined lane reference, such as may be indicated in a pre-generated map. A lane reference is depicted at FIG. 8 and may or may not be associated with a center of the lane (e.g., the lane reference may be a center of the lane for a straight lane portion, but on curves the lane reference may be biased toward the inside or outside of the curve).

The target type may define an action type for accomplishing the current route or mission. For example, the target type may specify a current lane of the vehicle, an adjacent lane, a parking space, a position in free space (e.g., where no lane markings exist), or the like.

The expansion variable may identify a weight, distance, factor, and/or other bounds on how far laterally (and/or longitudinally in some examples) unoccupied space can be explored (e.g., how far laterally candidate actions can take the vehicle). For example, the expansion variable may be a general constraint for how different the candidate actions may be.

The offset may identify a predetermined distance from the lane reference by which to iterate exploration of candidate actions. The distance may additionally or alternatively be determined dynamically based at least in part on sensor data, such as a speed of the vehicle, a complexity of the environment (see U.S. patent application Ser. No. 17/184,559, filed Feb. 24, 2021, the entirety of which is incorporated by reference herein), or the like.

The multiplier may be a factor between 0 and 1, which may be multiplied by the current maximum speed allowed by the law to determine the maximum speed associated with the candidate action. The multiplier may be randomized, varied according to a pattern, and/or may be constrained based at least in part on bounds set by the planning component based at least in part on the environment state data and the previous trajectory of the vehicle.

The propensity type may identify curvature, velocity, and/or acceleration constraints associated with different behavior types, such as "assertive," which may be associated with higher curvature, velocity, and/or acceleration and which may be required when the perception component detects a complex environment or other assertive traffic; "nominal" which may provide a baseline for typical interactions with other agents; "conservative;" and/or "submissive." The perception engine and/or the planning component may work together to determine the propensity type to be used, as discussed in more detail in U.S. patent application Ser. No. 17/006,679, filed Aug. 28, 2020, the entirety of which is incorporated by reference herein.

Once the planning component generates a first candidate action, the guidance component may update the data structure 332 to include the first action node 338 that identifies the first candidate action. FIG. 3B also depicts two more action nodes, 342 and 344, which are illustrated with dashed lines, as they may not be generated in cases where the tree search algorithm finds a low cost path with minimal exploration. In other words, action nodes 342 and 344 may be as-of-yet unexplored but may be generated upon additionally iterating operation 336 to enumerate additional candidate actions.

In some examples, the first candidate action may be associated with controlling the vehicle over a first time period. As discussed below, a candidate action of a layer deeper than the layer associated with the first candidate action (e.g., which includes action nodes 342 and 344) may be associated with controlling the vehicle over a second time period. In some examples, the time periods associated with each subsequent layer of action nodes may be equal or, in an additional or alternate example, the time periods may increase in length (e.g., exponentially, logarithmically). For example, the first candidate action may be associated with controlling the vehicle over a 1 second period, a second candidate action associated with an action node one layer deeper than the first layer (e.g., action node 356) may control the vehicle over 1.1 seconds, a third layer may control the vehicle over a period of 1.25 seconds, and so on. This increasing time period may ensure that a greater precision and/or accuracy is obtained for imminent actions, while also ensuring that the more distant actions won't control the vehicle in a manner that results in higher costs/negative outcomes.

At operation 346, example process 300 may comprise determining, using a lower bound cost, a first cost associated with the first candidate action, according to any of the techniques discussed herein. In some examples, determining the first cost may be part of determining the first candidate action at operation 336 and/or the cost determination may happen contemporaneously using different processing units or upon receiving the first candidate action. In some examples, the guidance system may determine the cost and the cost may be based at least in part on the environment state data. In particular, the cost be based at least in part on a variety of sub-costs such as proximity cost(s), safety cost(s), comfort cost(s), and/or progress cost(s). These sub-costs may be based at least in part on the environment state data indicated by the last prediction node (whether the last prediction node is the root node or another prediction node). The proximity cost(s) may be based at least in part on a minimum, average, or other distance that the candidate action take the vehicle from a static and/or dynamic object. The safety cost(s) may include a score indicating conformance to rules of the road, proximity to other object(s) and/or a velocity associated with the candidate action (e.g., the safety cost may penalize candidate actions that are close to (e.g., within a threshold distance of) an object and moving at a high speed and not penalize or only provide a small penalty to candidate actions that are close to an object but associated with a low speed—high speed candidate actions that are far from other objects may be unpenalized by this cost), and/or proximity to a non-drivable surface (e.g., sidewalk, building, closed lane). In an example where the safety cost(s) include a variable cost based on velocity and lateral distance to an object, the cost may be determined based at least in part a hinge function, such as an L1 or L2 hinge function. In some examples, the hinge point in the hinge function where a penalty starts being applied may be based on distance to the object, velocity associated with the candidate action, object track, and/or object type. For example, a penalty may start applying further away from a biker than from a vehicle and/or a penalty may be higher/more sever for bikers than for vehicles. Moreover, the penalty may be more severe the faster the velocity associated with the candidate action once the candidate action is within the threshold distance of the vehicle (e.g., the hinge point of the hinge function). In at least one example, the threshold distance for applying the penalty specified by the L1 or L2 hinge function may be based at least in part the velocity associated with the candidate action. In other words, fast candidate actions will have a penalty applied further from the object than slow candidate actions and the L1 or L2 penalty may become more severe (e.g., steeper slope in the case of L1, larger coefficient and/or squared value) the closer a fast candidate action comes to the object compared to the same distance from a slow candidate action to the object.

The comfort cost(s) may be based at least in part on a velocity, jerk, and/or acceleration associated with the candidate action and/or whether the candidate action would violate a threshold jerk and/or acceleration. The progress cost(s) may be based at least in part on completion of a mission or sub-goal (e.g., parking at a portion on a block, parking within a block, changing lanes) and/or displacement of the vehicle along the route. For example, the progress cost(s) may reward the further the vehicle would be along the route if the candidate action were executed. A cost that is calculated as a reward may have an opposite sign as the other sub-costs. For example, if there is a positive cost for a candidate action that would violate a comfort metric (e.g., the candidate action would exceed a threshold jerk), a reward may be a negative sub-cost. More details regarding how to determine the costs are discussed in U.S. patent application Ser. No. 16/872,284, filed May 11, 2020, the entirety of which is incorporated by reference herein.

In at least one example, the cost associated with a particular action node may include a cost of arrival (e.g., a sum of the costs of all the action node(s) leading up to that action node for any action node deeper than the first layer), a cost to execute the action (e.g., which may include the cost(s) discussed above, such as the comfort cost(s), progress cost(s), etc.), and a cost to progress further after that action node, which may also be characterizes as the cost to transition to a different state in the future. Modeling this future cost, also called the cost-to-go, may be complex and require a large amount of computational power when the number of action nodes being explored in the tree search is considered. In reinforcement learning, the cost-to-go is also called the "value" of being at the particular state.

In some examples, instead of determining all of the sub-costs, operation 346 may comprise using a lower bound cost or an upper bound cost to stand-in for determining at least a portion of the sub-costs, such as the cost-to-go. For example, the lower bound cost may be 0 and the upper bound cost may be the cost of using a default action. The lower bound cost may be a predefined heuristic although in an additional or alternate example, the lower bound may be determined by a machine-learned model trained based at least in part on simulating or operating the vehicle and determining a minimum cost of the action taken by the vehicle for similar scenarios. This machine-learned model may determine the lower bound cost based at least in part on the environment scenario data and/or a track associated with the vehicle (i.e., that data may be provided as input). In yet another example, the lower bound cost may be updated after all or most of the candidate actions have been determined that are based upon a prediction node. In such an instance, the lower bound cost may be updated to be the cost of the candidate action having the lowest cost.

The default action may be maintaining a current speed, heading, steering rate, etc. or the default action may be a predefined action, such as going straight at the speed limit detected as being associated with the portion of roadway upon which the vehicle is located. In another example, the default action may be determined by a machine-learned model dedicated to determining the default action based at least in part on perception data. Note that in the example depicted in FIGS. 3A-3C, the lower bound cost is used in the first action layer after the root node. This has only been done for the sake of example and an upper bound cost may be used instead of a lower bound cost. FIGS. 3A-3C merely illustrate that the lower bound cost and the upper bound cost may be used alternatingly. In some examples, the lower bound cost and the upper bound cost may alternate according to a ratio—three lower bound costs to two upper bound costs, two upper bound costs to two lower bound costs, four lower bound costs to one upper bound cost, etc.

In some instances, a ramping ratio may be used to change the ratio of the lower bound cost to upper bound cost used in successive layers. For example, the upper bound cost may be used more or exclusively in the lowest layers (e.g., the first two or three), before introducing the lower bound cost and increasing the frequency with which the lower bound cost is used for successive layers (or vice versa. In some examples where the tree is sufficiently deep, the ramping ratio may reach a steady state where the lower bound is exclusively used or where a particular ratio is used (e.g., leveling off at a 1:1 ratio). Purely using the lower bound cost guarantees that finding the optimal route since it causes the tree search algorithm to explore more of the tree. However, by incorporating the upper bound cost, the tree search algorithm is greedier and by balancing the ratio of use of the lower bound cost to use of the upper bound cost, the tree search algorithm may be tuned. In other words, tuning the tree search algorithm may comprise balancing the algorithm between completeness of the amount of the space explored/time and an amount of compute to find a path and finding the best path.

In some examples, search parameters, such as the ratio at which lower bound cost to upper bound cost is used or whether a lower bound or an upper bound cost is used exclusively may be determined based at least in part on perception data using a machine-learned model. For example, training data may be generated by experimentally altering the ratio used or exclusively using one of the lower bound cost or the upper bound cost and storing the path generated; the time, computational cycles, and/or number of nodes and/or layers it took to compute the path; the cost associated with the path; and/or how the lower bound/upper bound parameters were set. The machine-learned model may be trained to output tree search parameters predicted to decrease the computational cycles used, number of nodes explored, and/or cost associated with the path based on the perception data available to the machine-learned model, such as the environment state data indicated by the root node. The parameters may additionally or alternatively include a depth of the tree search, a width of the tree search, sampling parameters (discussed in more detail with reference to FIGS. 8A and 8B, such as how to vary predictions, the number of predictions made), parameters for determining whether to group prediction nodes into a single prediction node (e.g., whether an exact match of dependent candidate actions is required, a threshold distance used for identifying what qualifies as "similar," and/or k-means clustering parameters), whether or not dynamic objects may be reclassified during the tree search and/or how many layers the search may explore before reclassifying, etc.

By replacing at least part of the cost with a lower bound cost estimate or upper bound cost estimate, there may not be a need to run a simulation or execute the prediction component before the first candidate action is output and/or this replacement may reduce computational costs and increase the speed of the tree search algorithm.

Turning to FIG. 3C, at operation 348, example process 300 may comprise determining a first prediction node associated with a future state of the environment based at least in part on the first candidate action, according to any of the techniques discussed herein. In at least one example, determining the first prediction node may comprise executing the prediction component, which may execute a Kalman filter, machine-learned model, or a simulation. Running a simulation may comprise instantiating the simulation based at least in part on the environment state data and the first candidate action. The instantiation may use a set of template models that may include representations of various objects, such as three different passenger vehicle models, four different pedestrian models, and/or the like, which may be scaled and positioned as appropriate to match the environment state data indicated by the prediction node upon which the candidate action was based. Any number of different models may exist. In some examples, a template model may comprise a three-dimensional model of a surface of an object without any texturing, although in additional or alternate examples, the model may comprise texture. The template model may comprise a polygon mesh, a triangle mesh, and/or the like. In some examples, models associated with dynamic objects may have a higher polygon count than models associated with static objects. In yet another example, objects in the simulation may be simplified to basic two-dimensional or three-dimensional geometric shapes, corresponding with the dimensionality of the simulation. For example, vehicles and/or pedestrians may be represented as rectangles of different shapes, pedestrians may be represented as cylinders, etc.

In some examples, the instantiated simulated environment may comprise lighting and/or textures, but the techniques described herein work without lighting and/or textures. For two-dimensional simulations, lighting and textures may be eschewed. Moreover, lighting and textures may also be eschewed for three-dimensional simulations. The simulated environment may comprise a model of the vehicle 306 itself. In some examples, instantiating the environment portion of the simulated environment may be based at least in part on map data and/or perception data (which may be indicated by the environment state data associated with the prediction node upon which the first candidate action was based) and objects in the simulated environment may be based at least in part on the environment state data indicated by the prediction node upon which the first candidate action was based.

Executing the simulation may comprise controlling a simulated representation of vehicle 306 according to the candidate action and based on the simulation instantiation discussed above, which may comprise using the environment state data as indicated by the prediction node upon which the candidate action was based. Executing the simulation may additionally or alternatively comprise simulating motion of a dynamic object in the simulated environment. Simulating motion of a dynamic object may depend on whether the dynamic object is indicated as being reactive or passive, as determined by the agent filter, which may be indicated in the environment state data associated with the prediction node from which the candidate action was based. If the agent filter classifies a dynamic object as passive, a Kalman filter or other simpler prediction method may be used to determine a predicted trajectory of the dynamic object. However, if the agent filter classifies the dynamic object as reactive, the simulation component may control motion of the dynamic object using a separate instance of the planning component, an agent behavior model (see U.S. patent application Ser. No. 16/889,747, and/or one or more ML models trained to control a simulation of the dynamic object based at least in part on the candidate action. For example, the component that controls simulated movement of the dynamic object may generate commands for controlling the simulated dynamic object based at least in part on the simulated execution of the candidate action by the simulated vehicle 306. However, in another example, the simulation may be a mathematical construct or machine-learned model output.

Once the simulation is complete (e.g., upon completing the candidate action), the resulting predicted track(s) (e.g., position(s), orientation(s), etc. as discussed above) of the object(s) in the environment, including vehicle 306's resultant track from executing the first candidate action, may be used to determine updated environment state data. The data structure 332 may be updated to include a prediction node 350 that indicates this updated environment state data and the predicted state of the environment that may result from implementing the first candidate action. In some examples, the simulation may be re-executed using slightly different variables (e.g., changing a propensity of a dynamic object from "conservative" to "aggressive," "submissive," or "nominal) to determine second updated environment data associated with a different prediction node, prediction node 352. In some examples, the simulation component may output multiple potential scenarios, each of which may be associated with a likelihood. In such an example, the guidance component may create a prediction node for each potential (predicted) scenario that is associated with a likelihood that meets or exceeds a likelihood threshold.

In another example, one or more predictions may be grouped together in a single node based at least in part on determining a similarity between the predictions and/or determining a similarity of candidate actions determined based on those predictions. In other words, after a next set of candidate actions is determined in a subsequent action node layer (e.g., the layer that includes second action node 356), the process may include determining a similarity between the candidate actions of that layer. In some examples, this may include determining a Euclidean distance between positions in space and/or space-time defined by two candidate actions (e.g., a Euclidean distance at a particular time, such as the time associated with the layer of action nodes). In some examples, exact matches may be required, thresholding may be used (e.g., candidate actions identifying positions that are less than a threshold distance from each other may be identified as being similar), and/or k-means clustering may be used to determine that two (or more) candidate actions are similar (by virtue of being clustered into a same cluster).

If any candidate actions are identified as being similar, the process may comprise associating the predictions that the two (or more) similar candidate actions were generated from/dependent upon with a same prediction node. In some examples, when multiple predictions are associated with a same prediction node, the process may include determining a weight in association with each different prediction. The weight may indicate a degree to which the prediction belongs with that prediction node. Determining this weight may be based at least in part on the similarity of a candidate action generated from a prediction to one or more actions associated with different candidate actions associated determined from the other prediction(s). Grouping the predictions into a single prediction node may be used by the process to determine a smaller subset of candidate actions to explore, such as one or the top p candidate actions, as ranked by cost, where p is a positive integer. For example, the top two candidate actions, ranked according to cost, may be associated with the prediction node that identifies multiple predictions. Future exploration may be based at least in part on these two candidate actions.

In yet another example, the predictions of a particular prediction layer may be associated with all of the prediction nodes of that layer. In other words, there may be as many prediction nodes as there are prediction nodes and each prediction node may indicate all of the predictions. In such an example, a weight may be associated with each prediction and may indicate a likelihood of the prediction occurring and/or how similar the prediction is to a target prediction. Each prediction node may identify a different target prediction—in other words, the prediction nodes may cycle through the different predictions as a comparator.

Operation 348 may additionally or alternatively include a joining operation that may result in a single prediction node indicating two or more environment states and/or a single prediction node indicating a single environment state that represents two or more environment states associated with two or more former prediction nodes. For example, upon generating a second prediction node in a same layer as a first prediction node, such as prediction node 352 relative to prediction node 350, the example process 300 may comprise determining, by an ML model, a similarity of at least two prediction nodes. In such an example, the ML model may be a set of perceptrons and/or multiple layers of perceptrons (e.g., a CNN), a support vector machine (SVM), or the like. The ML model may be trained to output a score that indicates a similarity between two environment states. The ML model may be trained according to a supervised method that labels environment states as being similar or dissimilar. If the score output by the ML model meets or exceeds a threshold, the two (or more) prediction nodes may be joined into a single prediction node; otherwise, the prediction nodes may remain distinct. Based on the similarity, additional computational resources may be conserved since exploration of both nodes would yield a substantially similar product.

In yet another example, the ML model may determine an embedding associated with a prediction node, such as by determining an embedding associated with the environment state data, which may comprise transforming the environment state data into a highly-dimensional data structure and projecting the highly-dimensional data structure into an embedding space. In such an example, the ML model may include an embedding algorithm such as uniform manifold approximation and projection (UMAP), t-distributed stochastic neighbor embedding (t-SNE), ISO map, local linear embedding (LLE), or other such algorithm. In an example where the example process 300 determines an embedding for each of two prediction nodes and determining a distance (e.g., a Euclidean distance) in the embedding space between the two embeddings. If the distance is less than a threshold distance the prediction nodes may be joined; otherwise, the prediction nodes may remain distinct.

At operation 354, example process 300 may comprise determining a second candidate action for controlling motion of a vehicle based at least in part on environment state data indicated by a preceding prediction node, according to any of the techniques discussed herein. For example, determining the second candidate action may be based at least in part on the environment state data indicated by prediction node 350. This relationship between the prediction node and the candidate action based thereon is indicated by an arrow. In some examples, determining the second candidate action based at least in part on the prediction node 350 may be based at least in part on determining that the simulation that resulted in the updated environment state data associated with prediction node 350 didn't result in a violation of an operating constraint, that a cost was not exceeded, or that there was not an impact.

To give an example and without limitation, the operating constraint(s) may include kinematic and/or qualitative metrics associated with operation of the vehicle, such as a minimum distance between the vehicle and a nearest object, an acceleration required to avoid impact, a time until impact, a deviation from a route, whether a jerk and/or acceleration by the vehicle met or exceeded a threshold jerk and/or a threshold acceleration, a predicted likelihood of impact, etc. The operating constraint(s) may additionally or alternatively comprise weights associated with different minimum distances that may be used to reduce the reward or boost the reward based at least in part on the minimum distance that the simulated autonomous vehicle came from any object during the simulation.

In some examples, a final cost associated with the first candidate action may be determined after and/or contemporaneously with generation of the prediction node 350. In some examples, determining to generate the second candidate action may be based at least in part on this final cost. For example, other final cost(s) may be determined in association with action nodes 342 and/or 344 and/or prediction nodes dependent therefrom. Determining to generate a second candidate action that branches from the first action node 338 (via prediction node 35) may be based at least in part on determining that the first action node 338 is associated with a sum cost of action that is less than the sum cost of taking another action. Sum cost refers to the cost of the candidate action in question and the total cost of any preceding actions in the branch leading to the candidate action in question. In the case of the second candidate action, the sum cost would be the final cost associated with the second candidate action plus the final cost associated with the first candidate action.

The data structure 332 may be updated to include the second action node 356 and action node(s) associated with any other candidate actions determined based at least in part on prediction node 350. Note that FIGS. 3B and 3C illustrate a simplification of the process where only one branch of each layer is explored. Additional actions may be determined from a same prediction node, as depicted by action nodes 342 and 344, or from different prediction nodes; additional prediction nodes may be determined; and so on. Prediction nodes 350 and 352 may be considered to be in a second layer of prediction nodes, as the root node 330 may itself include predicted environment state data.

Example process 300 may initiate operation(s) 358 and/or 360 based at least in part on determining the second candidate action although, in some examples, operation 358 may additionally or alternatively be determined based at least in part on operation 348.

At operation 358, example process 300 may comprise determining whether a dynamic object may be represented as a passive agent or a reactive agent, according to any of the techniques discussed herein. Operation 358 may comprise re-classifying at least one of the dynamic objects in indicated by a most recent prediction node, such as prediction node 350 or 352. In some examples, operation 358 may be part of operation 348 although in some examples, operation 358 may receive a candidate action as input, which may include waiting for a next candidate action to be generated based at least in part on a prediction node. In the depicted example, updating the dynamic object classifications for prediction node 350 may include using the second candidate action determined in association with the second action node 356. In some examples, the agent filter may be trained to classify dynamic objects without using the candidate action as input, in which case operation 358 may be part of operation 348.

Regardless, a track associated with a dynamic object, as indicated by the environment state data associated with a prediction node, may be provided as input to the agent filter along with a pose and/or track of the vehicle. Note that, at this stage in the tree search, the environment state data includes a predicted track of the dynamic object. The agent filter may treat the predicted track of the dynamic object as a current track and the current track identified by the root node would be treated as a historical track, or the agent filter may treat the predicted track as a predicted track. In other words, the agent filter may be trained to handle multiple time steps of the track, including historical tracks, current tracks, and/or predicted tracks. In some instances, the agent filter may use a portion of an available track associated with a time window, such as the last n seconds, where n is a positive number, with reference to a most recent time in the tree search space.

If the classification of a dynamic object changes, as determined by the agent filter, the classification of that object may be modified in the environment state data associated with the prediction node. For example, a reactive object may be reclassified as a passive object or vice versa. At operation 362, example process 300 may include changing such a status at the appropriate prediction node in the data structure. In some examples, this new classification may be used by the agent filter as part of a simulation to determine a subsequent prediction node, at operation 364. For example, an unillustrated prediction node determined based on the second action node 356 may use the updated classification determined at operations 358 and 362 as part of a simulation. If no classifications change for any of the dynamic objects identified in the environment state data identified by a prediction node, the example process 300 may continue without modifying that prediction node.

At operation 360, example process 300 may comprise determining, using an upper bound cost, a second cost associated with the second candidate action, according to any of the techniques discussed herein. As discussed above and purely for the sake of example, a lower bound cost was used at operation 346 and alternating use of the lower bound cost and upper bound cost according to a 1:1 ratio would dictate that an upper bound cost be used at operation 360. However, as discussed above, the upper bound cost may be used first and the ratio may be any other ratio other than 1:1. Regardless, determining the second cost may comprise using the upper bound cost, which may be a predetermined cost associated with a default action.

At operation 366, example process 300 may comprise controlling the vehicle based at least in part on a path that comprises the first candidate action and the second candidate action based at least in part on a total cost associated therewith, according to any of the techniques discussed herein. For example, the tree search may continue to alternately determine action nodes and prediction nodes until a termination event, such as determining a predefined number of action nodes, a time limit for the computation, a computation or storage limit, a displacement along the route is achieved, a number of time steps has been reached (e.g., actions up to a time horizon have been determined), determining an action that reaches a target position, determining that a path to a target position is less than a cost threshold, or the like.

The guidance component may determine one or more contiguous paths through the sets of action nodes as the sets of nodes are generated and/or termination event occurs. In some examples, the guidance component may trace one or more potential paths through the sets of action nodes as they are generated and back-trace a lowest-cost path (i.e., from a node at the end of the potential path in a last layer of nodes to a start point/the root node and/or at a current position of the vehicle) to ensure it is impact-free. Regardless, the guidance system may determine a contiguous path through the sets of nodes that is associated with a lowest cost and/or that makes the most progress along the route. A contiguous path of action nodes is a set of nodes that are connected by a dependency in the data structure 332. Intervening prediction nodes are not taken into account for the sake of path planning beyond the sub-costs they may indicate. Two action nodes are dependent when they are connected by an intervening prediction node, which indicates that the lower-level action node (e.g., second action node 356) starts from an end position of the higher-level action node (e.g., first action node 338).

The guidance system may conduct a search for the path from the root node to a last layer of the data structure 332. Conducting the search may comprise determining a contiguous set of connections between nodes of the different sets of nodes from the root node to an action node in a deepest layer of the data structure 332. Determining the path may comprise searching for solutions in the multivariate space that maximize a combination of displacement along the route and lateral/azimuthal diversity among the solutions (or meet a diversity heuristic) and minimize cost based at least in part on the cost map in the time interval given. For example, the search algorithm may comprise an algorithm such as, for example D*, D*lite, Focused Dynamic A*, A*, LPA*, Dijkstra's algorithm, and/or the like, although other search algorithms for searching and/or generating a directed graph and/or a weighted directed graph may be used. In some examples, the search may be configured with a ruleset that may comprise one or more rules, e.g., specifying a boundary within which to determine the path (e.g., the boundary may be determined based at least in part on sensor data and/or a map), node connection rules (e.g., nodes may have only one parent node), and/or the like. In some examples, the search may comprise determining a directed graph between nodes of the sets of nodes. The directed graph may comprise a connection (e.g., edge) between a first node and a second node and/or weight (e.g., cost) associated with the connection.

In some examples, before conducting a full search for a path, the guidance component may comprise determining if a previous path and/or previous connection determined by the guidance system is feasible (e.g., satisfies current constraints such as velocity, maximum steering angle, and/or boundaries; is impact-free; has a cost that is less than a cost threshold).

In some examples, the path determined by the guidance system may be a coarse path. For example, the coarse path may identify a position, heading, velocity, and/or curvature of approach for the vehicle to track at a 1 second or 500 millisecond interval, but the components of the vehicle may require or be capable of control over a finer time interval (e.g., 10 milliseconds, 100 milliseconds). In other words, the coarse path may not be smooth enough for the vehicle to track without significant errors. In some examples, a processor of a first type (e.g., a graphics processing unit (GPU)) may determine the prediction nodes and action nodes and/or determine the path and a processor of a second type may smooth the path generated by the GPU and/or determine a trajectory for controlling the vehicle based at least in part on the smooth path.

The guidance system discussed herein may identify a path as feasible and/or determine a confidence score associated with the path based at least in part on the costs discussed herein. The guidance system may output the path and/or confidence score, which the autonomous vehicle may use to control motion of the autonomous vehicle, e.g., by generating a trajectory based at least in part on the path. In some examples, the guidance system may output a primary path and/or a contingent path. For example, the guidance system may determine the contingent path based at least in part on generating a set of candidate paths, determining that the set comprises two groups of candidate paths based at least in part on a threshold distance (e.g., the two groups may be two distinct homotopic groups), and selecting a primary path from a first group and a contingent path from the second group. In some examples, the primary path may be selected as the primary path based at least in part on determining that the primary path is associated with a first total cost that is less than a second total cost associated with the contingent path. The primary path may be associated with a first total cost and/or the contingent path may be associated with a second total cost that is/are less than a cost threshold and/or may be minimum costs of the respective groups associated therewith.

Figure 4:
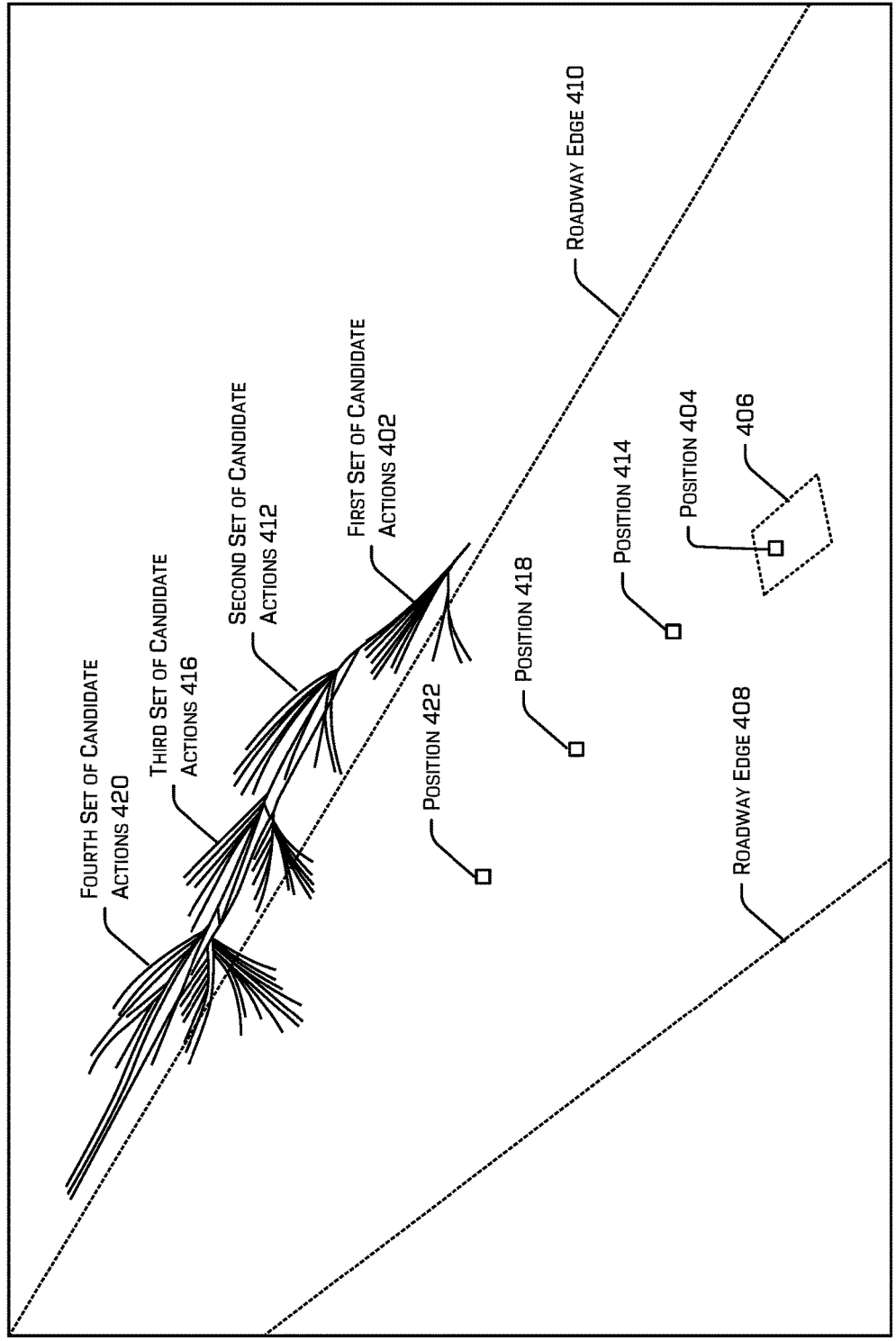
FIG. 4 illustrates a three-dimensional representation of sets of different candidate trajectories generated for a branch of the tree search discussed herein for different time steps/locations in the environment associated with the branch.

FIG. 4 illustrates a three-dimensional representation 400 of four different sets of candidate actions (i.e., trajectories in the depicted example) generated at four different action layers of the tree search. The first set of candidate actions 402 were generated based at least in part on a position 404 of the vehicle. These candidate actions 402 may additionally or alternatively be determined based at least in part on an orientation, velocity, acceleration, steering rate, environment state data indicated in association with a root node (as discussed in more detail above regarding static/dynamic objects, etc.), etc. associated with operation of the vehicle. The space occupied by the vehicle is represented at 406 as a dashed line. FIG. 4 also represents two roadway edges, roadway edge 408 and roadway edge 410. The height of a candidate action indicates a velocity and/or acceleration associated with the candidate action.

A second set of candidate actions 412 may be generated based at least in part on selecting a first candidate action of the first set of candidate actions 402 for exploration and based at least in part on a final position 414, orientation, velocity, steering rate, etc. that the first candidate action would cause the vehicle to accomplish upon concluding execution of the first candidate action and environment state data. The second set of candidate actions 412 may additionally or alternatively be determined based at least in part on environment state data indicated by prediction node determined based at least in part on the first candidate action.

The third set of candidate actions 416 may similarly be based at least in part on selection of a second candidate action from among the second set of candidate actions 412; environment state data generated in association therewith; and/or the final position 418, orientation, velocity, steering rate, etc. that the second candidate action would effect. The fourth set of candidate actions 420 may similarly be based at least in part on selection of a third candidate action from among the third set of candidate actions 416; environment state data generated in association therewith; and/or the final position 422, orientation, velocity, steering rate, etc. that the third candidate action would effect.

The representation 400 may be a visual depiction of a determinized sparse partially observable tree (DESPOT) determined according to a partially observable Markov decision process (POMDP).

Figure 5A:
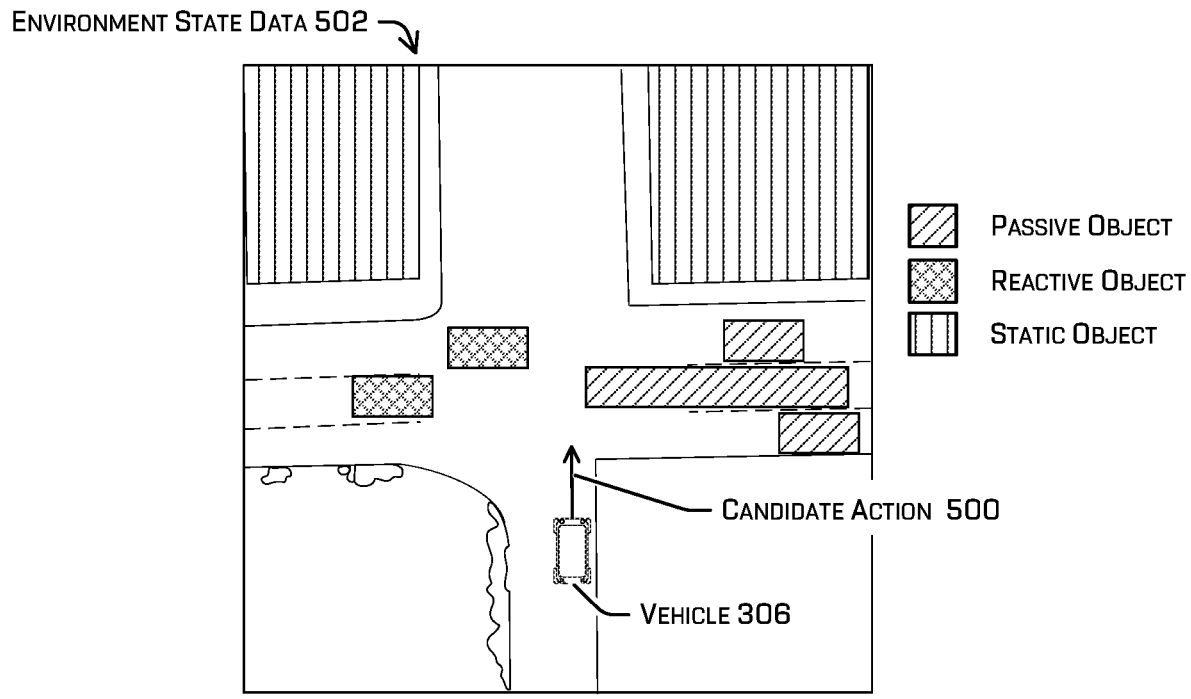
FIGS. 5A and 5B illustrate a top-down illustration of different candidate actions that may be generated by the tree search for different action nodes of a same level of the tree search.
Figure 5B:
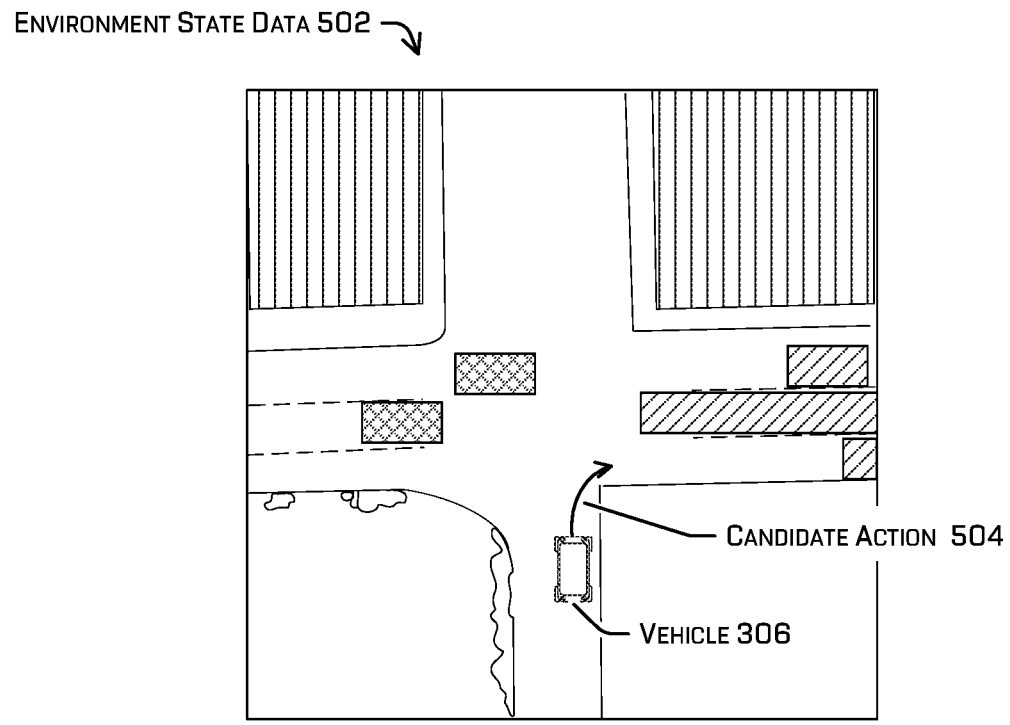

FIGS. 5A and 5B illustrate a top-down illustration of different candidate actions that may be generated by the tree search for different action nodes of a same level of the tree search. For example, in FIG. 5A, candidate action 500 may be generated based on environment state data 502, which may be indicated by a prediction node. In FIG. 5B, candidate action 504 may be generated based on environment state data 502, which may be indicated by the same prediction node. For example, candidate action 500 may represent candidate action 340 that is associated with first action node 338 and candidate action 504 may be associated with another action node in the same layer of the data structure, such as action node 344.

FIGS. 6A and 6B illustrate a top-down illustration of two different predicted environment states, environment state data 600 and environment state data 602, associated with a single prediction node or two different prediction nodes that may be determined based at least in part on the candidate action 500 depicted in FIG. 5A. The difference between the environment states may be based at least in part on altering parameters of a simulation of the candidate action 500, such as is discussed above regarding operation(s) 348 and/or 364. In a first simulation that may result in determining environment state data 600, the two reactive objects, vehicle 604 and vehicle 606, may both be assigned the propensity "nominal" or "conservative," which may cause vehicle 606 to come to a full stop and for vehicle 604 to come to a full stop or to slow in view of the vehicle 306's simulated execution of the candidate action 500, which may result in the final position 608 of the vehicle 306.

Turning to FIG. 6B, the environment state data 602 may be determined based at least in part on a simulation where the two reactive objects, vehicle 604 and vehicle 606, may both be assigned the propensity "aggressive" or "low attention," which may cause them to ignore, fail to account for, or attempt to cut-off the vehicle 306 as it executed candidate action 500, resulting in vehicles 604 and 606 being positioned in front of the vehicle 306.

In at least one example, environment state data 600 may be associated with a first prediction node and environment state data 602 may be associated with a second prediction node since the two environment states may be sufficiently different that a joining operation may determine that the two states should be separate. For example, environment state data 600 may be associated with prediction node 350 and environment state data 602 may be associated with prediction node 352. Note that both of these prediction nodes depend from a same action node, i.e., first action node 338, since the environment state data associated therewith was both determined based at least in part on a same action, i.e., candidate action 500, which may represent candidate action 340. Not also that these prediction nodes are in a same layer of the data structure 332. In an additional or alternate example where the resulting environment states are more similar, the two environment states can both be indicated by a same prediction node or one environment state can represent both environment states, such as by selecting a representative environment state or by averaging the environment states.

Figure 7A:
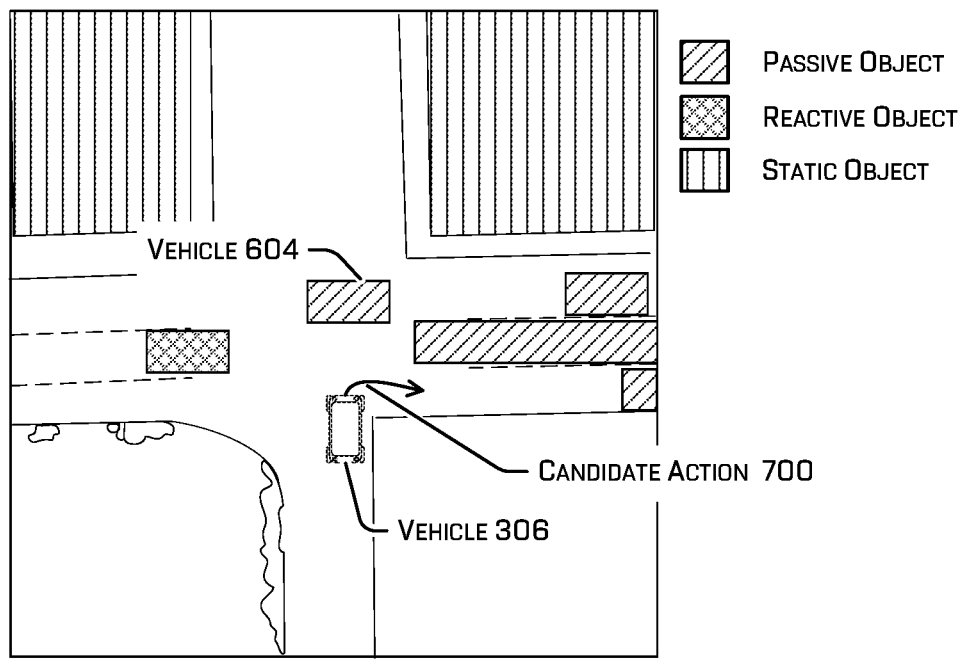
FIGS. 7A and 7B illustrate a top-down illustration of two different candidate actions generated based on the state illustrated in FIG. 6A and associated with a first prediction node.
Figure 7B:
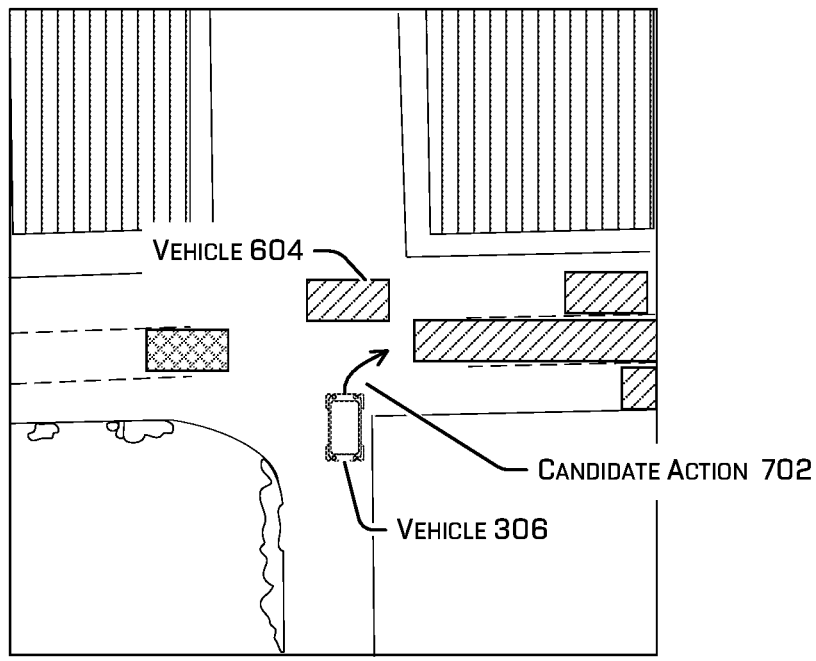

FIGS. 7A and 7B illustrate a top-down illustration of a two different candidate actions, candidate action 700 and candidate action 702 respectively, generated based on the environment state data 600 illustrated in FIG. 6A and associated with a first prediction node, e.g., prediction node 350. For example, candidate action 700 may be associated with second action node 356 and candidate action 702 may be associated with an unillustrated action node that also depends from prediction node 350 like action node 356.

FIGS. 7A and 7B also illustrate the result of agent filtering that alters the classification of a dynamic object from a reactive object to a passive object for use by the prediction and/or simulation component in generating a next level of prediction node(s) based on candidate action 700 or candidate action 702, respectively. Operation(s) 358 and/or 362 may result in this change. Compare the classification of vehicle 604 in FIGS. 6A and 6B where the vehicle 604 is classified as a reactive object to the classification of vehicle 604 in FIGS. 7A and 7B where the vehicle 604 has been reclassified as a passive object. In such an example, operations 358 and 362 may comprise classifying vehicle 604 as a passive object. This may be the case because vehicle 604 has reached a point where the vehicle 604 will no longer change its behavior or is unlikely to change its behavior based on an action of the vehicle 306. This means that, in a subsequent prediction operation, vehicle 604 may be simulated more simplistically and without regard for a candidate action of vehicle 306.

Figure 8A:
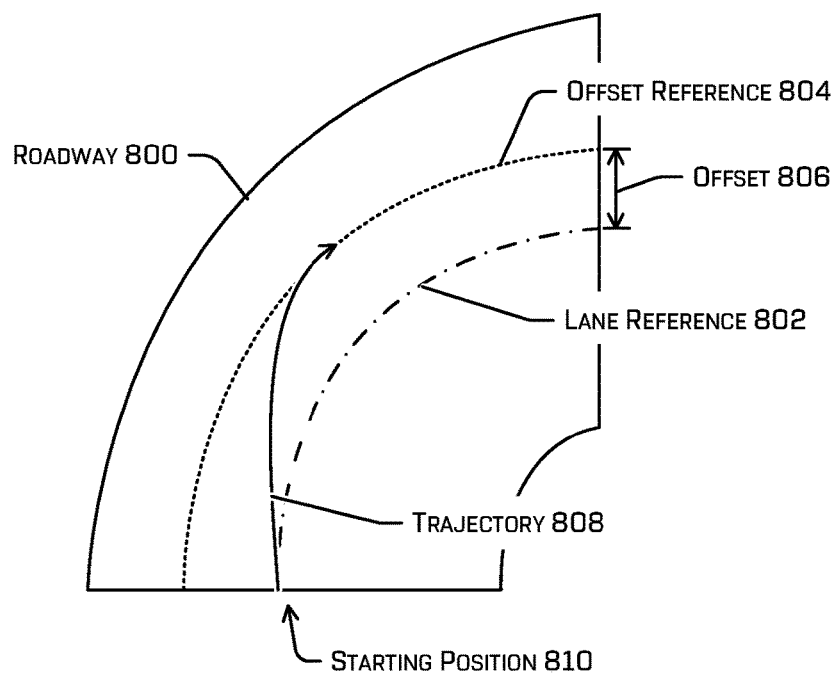
FIG. 8A illustrates a top-down illustration of a curved roadway, a lane reference, and an offset reference used to stochastically generate actions for the tree search.
Figure 8B:
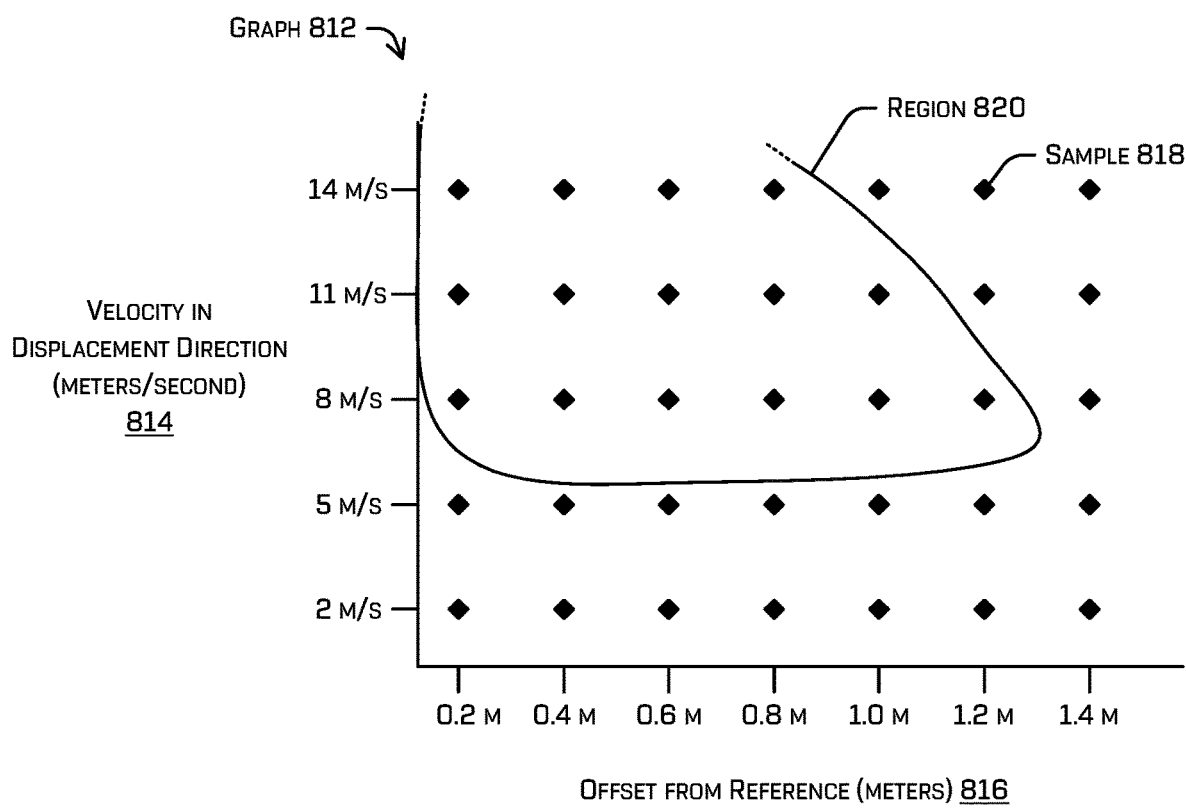
FIG. 8B illustrates a graph demonstrating a sampling technique for determining actions for the tree search that may be used to ensure enough of the parameter space is sampled to find an adequate path.

FIGS. 8A and 8B illustrate additional details regarding candidate action determination. FIG. 8A illustrates a top-down illustration of a curved roadway 800, a lane reference 802, and an offset reference 804 used to stochastically generate actions for the tree search. The depicted roadway 800 may be a single lane for the sake of simplicity. The lane reference 802 may be predetermined and stored in association with a map or the lane reference 802 may be determined by the perception component of the vehicle 306. The offset 806 may be stochastically or iteratively determined, as discussed in more detail in reference to FIG. 8B. The offset may be used to determine the offset reference 804, which may be a transposition of the lane reference 802 by an amount defined by the offset 806. The guidance component and/or the planning component may determine a candidate action based at least in part on the lane reference 802 when the offset is 0, which would include generating a trajectory that follows the lane reference 802. Tracking the lane reference at a velocity equal to or accelerating/decelerating to equal a maximally allowed lawful speed (or a predefined speed below the maximally allowed lawful speed, such as in a complex environment as determined according to U.S. patent application Ser. No. 17/184,559, may be a default policy used by the tree search. This default policy may be used to determine the upper bound cost, in some examples. The default policy may be a best-case action, such as if all other agents are modeled as being attentive or submissive (yielding to the vehicle), or such that minimizes comfort costs and/or overall cost.

In an example where the offset is non-zero, determining the candidate action may comprise determining a trajectory 808 by drawing a curve, Bezier, gradient, or the like bounded according to smoothness constraints associated with comfort metrics and/or steering capabilities of the vehicle from a starting position 810 to a position on the offset reference 804.

FIG. 8B illustrates a graph 812 demonstrating a sampling technique for determining actions for the tree search that may be used to ensure enough of the parameter space is sampled to find an adequate path. This may ensure diversity of the candidate actions indicated by the action nodes so that a separate action node joining operation isn't needed. In additional or alternate examples, a joining operation, such as the one discussed above for prediction nodes, may be used to join similar action nodes to trim down the data structure. The depicted graph 812 only depicts two parameters that may be varied among the candidate actions, the velocity in a displacement direction along the route 814 (represented on the y-axis) and the offset 816 from the lane reference (represented on the x-axis). It is understood that additional or alternate parameters may be used to generated the candidate action(s), such as steering rate, final heading, position within the environment, acceleration, lateral and/or longitudinal velocity (instead of or in addition to velocity along the route), etc. Graph 812 includes samples, such as sample 818 illustrated as diamonds, which are sampled according to 3 meter per second and 0.2 meter spacing. Any other spacing may be used to sample the space and the spacing may be a predetermined value based on the type of parameter being sampled and may be selected such that the candidate actions are sufficiently different. In some examples, samples may be limited to a region such as region 820. Region 820 may be determined based at least in part on perception data, environment state data, a current trajectory, and/or a previous action. In the depicted example, the vehicle may currently be moving quickly, so it may not be feasible to decelerate to 0 meters per second at the next time step. At most, the vehicle may be able to decelerate to 8 meters per second at the next time step. Also, the higher the speed of the vehicle, the closer the vehicle may get to violating a curvature/steering rate constraint, which may be dependent on speed, thereby limiting the offset value. In other words, the faster the vehicle moves, the narrower (laterally) the candidate actions may be in order to not exceed a lateral acceleration or jerk.

EXAMPLE CLAUSES

A: A method comprising: receiving route data associated with a start position and an end position in an environment; receiving sensor data from a sensor; determining, based at least in part on the sensor data and the route data, a first candidate action for controlling motion of a vehicle; determining a first cost associated with the first candidate action, the first cost being based at least in part on a lower bound cost, the lower bound cost being an estimate of a minimum cost of an action to alter a first state of the vehicle at a time associated with a beginning of the first candidate action; determining, based at least in part on the first candidate action and the sensor data, a first prediction associated with a first state of the environment, the first prediction comprising a first state of an object in the environment at a future time; determining, based at least in part on the first prediction and the route data, a second candidate action for controlling motion of the vehicle; determining a second cost associated with the second candidate action, the second cost based at least in part on an upper bound cost, the upper bound cost being an estimate of a cost to execute a default action; alternately applying one of the lower bound cost or the upper bound cost to one or more subsequent candidate actions; and controlling the vehicle based at least in part on: a path that comprises the first candidate action and the second candidate action; and determining that a first total cost comprising the first cost and the second cost is less than a threshold or less than a second total cost associated with a second path comprising at least one candidate action that is different from at least one of the first candidate action or the second candidate action.

B: The method of paragraph A, further comprising: determining, by a machine-learned model and based at least in part on the sensor data, that the object is a reactive object;

and determining, based at least in part on executing a first simulation using the determination that the object is a reactive object, the first prediction, wherein executing the first simulation using the determination that the object is a reactive object comprises determining a motion of a representation of the object based at least in part on the first candidate action.

C: The method of either paragraph A or B, further comprising: determining, by a machine-learned model and based at least in part on the sensor data, that the object is a passive object; and determining, based at least in part on modeling motion of the passive object, the first prediction, wherein modeling motion of the passive object comprises determining motion of the passive object based at least in part on a state of the object and exclusive of the first candidate action.

D: The method of any one of paragraphs A-C, further comprising assigning, to a same prediction node of a data structure, the first candidate action, and the second candidate action, the first prediction and a second prediction associated with a same prediction layer as the first prediction based at least in part on: determining a first set of candidate actions based at least in part on the first prediction and a second set of candidate action s based at least in part on the second prediction; determining a first action from among the first set associated with a first minimum cost from among costs associated with the first set; determining a second action from among the second set associated with a second minimum cost from among costs associated with the first set; and determining that the first action and the second action are associated with positions that are within a distance from each other that is less than a threshold distance.

E: The method of any one of paragraphs A-D, further comprising: determining, based at least in part on the sensor data, a likelihood that the object will modify a behavior in response to one or more of the first candidate action or the second candidate action; and one of: determining to classify the object as a reactive agent based at least in part on the likelihood meeting or exceeding a threshold; or determining to classify the object as a passive agent based at least in part on the likelihood being less than or equal to the threshold.

F: The method of any one of paragraphs A-E, wherein the lower bound cost is zero and the upper bound cost is determined based at least in part on at least one of the second candidate action or a cost associated with a default trajectory.

G: A system comprising: one or more processors; and a memory storing processor-executable instructions that, when executed by the one or more processors, cause the system to perform operations comprising: receiving route data associated with a start position and an end position in an environment; receiving sensor data from a sensor; determining, based at least in part on the sensor data and the route data, a first candidate action for controlling motion of a vehicle; determining a first cost associated with the first candidate action, the first cost being based at least in part on a lower bound cost, the lower bound cost being an estimate of a minimum cost of an action to alter a first state of the vehicle at a time associated with a beginning of the first candidate action; determining, based at least in part on the first candidate action and the sensor data, a first prediction associated with a first state of the environment, the first prediction comprising a first state of an object in the environment at a future time; determining, based at least in part on the first prediction and the route data, a second candidate action for controlling motion of the vehicle; determining a second cost associated with the second candidate action, the second cost based at least in part on an upper bound cost, the upper bound cost being an estimate of a cost to execute a default action; alternately applying one of the lower bound cost or the upper bound cost to one or more subsequent candidate actions; and controlling the vehicle based at least in part on: a path that comprises the first candidate action and the second candidate action; and determining a first total cost associated with the first candidate action and the second candidate action.

H: The system of paragraph G, wherein the operations further comprise: determining, by a machine-learned model and based at least in part on the sensor data, that the object is a reactive object; and determining, based at least in part on executing a first simulation using the determination that the object is a reactive object, the first prediction, wherein executing the first simulation using the determination that the object is a reactive object comprises determining a motion of a representation of the object based at least in part on the first candidate action.

I: The system of either paragraph G or H, wherein the operations further comprise: determining, by a machine-learned model and based at least in part on the sensor data, that the object is a passive object; and determining, based at least in part on modeling motion of the passive object, the first prediction, wherein modeling motion of the passive object comprises determining motion of the passive object based at least in part on a state of the object and exclusive of the first candidate action.

J: The system of any one of paragraphs G-I, wherein the operations further comprise assigning, to a same prediction node of a data structure, the first candidate action, and the second candidate action, the first prediction and a second prediction associated with a same prediction layer as the first prediction based at least in part on: determining a first set of candidate actions based at least in part on the first prediction and a second set of candidate action s based at least in part on the second prediction; determining a first action from among the first set associated with a first minimum cost from among costs associated with the first set; determining a second action from among the second set associated with a second minimum cost from among costs associated with the first set; and determining that the first action and the second action are associated with positions that are within a distance from each other that is less than a threshold distance.

K: The system of any one of paragraphs G-J, wherein the operations further comprise: determining, based at least in part on the sensor data, a likelihood that the object will modify a behavior in response to one or more of the first candidate action or the second candidate action; and one of: determining to classify the object as a reactive agent based at least in part on the likelihood meeting or exceeding a threshold; or determining to classify the object as a passive agent based at least in part on the likelihood being less than or equal to the threshold.

L: The system of any one of paragraphs G-K, wherein the lower bound cost is zero and the upper bound cost is determined based at least in part on at least one of the second candidate action or a cost associated with a default trajectory.

M: The system of any one of paragraphs G-L, wherein controlling the vehicle based at least in part on the path is further based at least in part on determining that the first total cost is less than a threshold or less than a second total cost associated with a second path comprising at least one candidate action that is different from at least one of the first candidate action or the second candidate action.

N: A non-transitory computer-readable medium storing processor-executable instructions that, when executed by one or more processors, cause one or more processors to perform operations comprising: receiving route data associated with a start position and an end position in an environment; receiving sensor data from a sensor; determining, based at least in part on the sensor data and the route data, a first candidate action for controlling motion of a vehicle; determining a first cost associated with the first candidate action, the first cost being based at least in part on a lower bound cost or an upper bound cost; determining, based at least in part on the first candidate action and the sensor data, a first prediction associated with a first state of the environment, the first prediction comprising a first state of an object in the environment at a future time; determining, based at least in part on the first prediction and the route data, a second candidate action for controlling motion of the vehicle; determining a second cost associated with the second candidate action, the second cost based at least in part on the lower bound cost or the upper bound cost; alternately applying one of the lower bound cost or the upper bound cost to one or more subsequent candidate actions; and controlling the vehicle based at least in part on: a path that comprises the first candidate action and the second candidate action; and determining a first total cost associated with the first candidate action and the second candidate action.

O: The non-transitory computer-readable medium of paragraph N, wherein the operations further comprise: determining, by a machine-learned model and based at least in part on the sensor data, that the object is a reactive object; and determining, based at least in part on executing a first simulation using the determination that the object is a reactive object, the first prediction, wherein executing the first simulation using the determination that the object is a reactive object comprises determining a motion of a representation of the object based at least in part on the first candidate action.

P: The non-transitory computer-readable medium of either paragraph N or O, wherein the operations further comprise: determining, by a machine-learned model and based at least in part on the sensor data, that the object is a passive object; and determining, based at least in part on modeling motion of the passive object, the first prediction, wherein modeling motion of the passive object comprises determining motion of the passive object based at least in part on a state of the object and exclusive of the first candidate action.

Q: The non-transitory computer-readable medium of any one of paragraphs N-P, wherein the operations further comprise assigning, to a same prediction node of a data structure, the first candidate action, and the second candidate action, the first prediction and a second prediction associated with a same prediction layer as the first prediction based at least in part on: determining a first set of candidate actions based at least in part on the first prediction and a second set of candidate action s based at least in part on the second prediction; determining a first action from among the first set associated with a first minimum cost from among costs associated with the first set; determining a second action from among the second set associated with a second minimum cost from among costs associated with the first set; and determining that the first action and the second action are associated with positions that are within a distance from each other that is less than a threshold distance.

R: The non-transitory computer-readable medium of any one of paragraphs N-Q, wherein the operations further comprise: determining, based at least in part on the sensor data, a likelihood that the object will modify a behavior in response to one or more of the first candidate action or the second candidate action; and one of: determining to classify the object as a reactive agent based at least in part on the likelihood meeting or exceeding a threshold; or determining to classify the object as a passive agent based at least in part on the likelihood being less than or equal to the threshold.

S: The non-transitory computer-readable medium of any one of paragraphs N-R, wherein: the lower bound cost is an estimate of a minimum cost of an action to alter a first state of the vehicle at a time associated with a beginning of the first candidate action; and the upper bound cost is determined based at least in part on at least one of the second candidate action or a cost associated with a default trajectory.

T: The non-transitory computer-readable medium of any one of paragraphs N-S, wherein controlling the vehicle based at least in part on the path is further based at least in part on determining that the first total cost is less than a threshold or less than a second total cost associated with a second path comprising at least one candidate action that is different from at least one of the first candidate action or the second candidate action.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
receiving route data associated with a start position and an end position in an environment;
receiving sensor data from a sensor;
determining, based at least in part on the sensor data and the route data, a first candidate action for controlling motion of a vehicle;
determining a first cost associated with the first candidate action, the first cost being based at least in part on a lower bound cost, the lower bound cost being an estimate of a lowest cost of an action to alter a first state of the vehicle at a time associated with a beginning of the first candidate action;
determining, based at least in part on the first candidate action and the sensor data, a first prediction associated with a first state of the environment, the first prediction comprising a first state of an object in the environment at a future time;
determining, based at least in part on the first prediction and the route data, a second candidate action for controlling motion of the vehicle;
determining a second cost associated with the second candidate action, the second cost based at least in part on an upper bound cost, the upper bound cost being an estimate of a cost to execute a default action;
alternately applying one of the lower bound cost and the upper bound cost to one or more subsequent candidate actions; and
controlling the vehicle based at least in part on:
a path that comprises the first candidate action and the second candidate action; and
determining that a first total cost comprising the first cost and the second cost is less than a threshold or less than a second total cost associated with a second path comprising at least one candidate action that is different from at least one of the first candidate action or the second candidate action.

2. The method of claim 1, further comprising:
determining, by a machine-learned model and based at least in part on the sensor data, that the object is a reactive object; and
determining, based at least in part on executing a first simulation using the determination that the object is a reactive object, the first prediction,
wherein executing the first simulation using the determination that the object is a reactive object comprises determining a motion of a representation of the object based at least in part on the first candidate action.

3. The method of claim 1, further comprising:
determining, by a machine-learned model and based at least in part on the sensor data, that the object is a passive object; and
determining, based at least in part on modeling motion of the passive object, the first prediction,
wherein modeling motion of the passive object comprises determining motion of the passive object based at least in part on a state of the object and exclusive of the first candidate action.

4. The method of claim 1, further comprising assigning, to a same prediction node of a data structure, the first candidate action, and the second candidate action, the first prediction and a second prediction associated with a same prediction layer as the first prediction based at least in part on:
determining a first set of candidate actions based at least in part on the first prediction and a second set of candidate actions based at least in part on the second prediction;
determining a first action from among the first set associated with a first minimum cost from among costs associated with the first set;
determining a second action from among the second set associated with a second minimum cost from among costs associated with the first set; and
determining that the first action and the second action are associated with positions that are within a distance from each other that is less than a threshold distance.

5. The method of claim 1, further comprising:
determining, based at least in part on the sensor data, a likelihood that the object will modify a behavior in response to one or more of the first candidate action or the second candidate action; and
one of:
determining to classify the object as a reactive agent based at least in part on the likelihood meeting or exceeding a threshold; or
determining to classify the object as a passive agent based at least in part on the likelihood being less than or equal to the threshold.

6. The method of claim 1, wherein the lower bound cost is zero and the upper bound cost is determined based at least in part on at least one of the second candidate action or a cost associated with a default trajectory.

7. A system comprising:

one or more processors; and a memory storing processor-executable instructions that, when executed by the one or more processors, cause the system to perform operations comprising:

receiving route data associated with a start position and an end position in an environment;

receiving sensor data from a sensor;

determining, based at least in part on the sensor data and the route data, a first candidate action for controlling motion of a vehicle;

determining a first cost associated with the first candidate action, the first cost being based at least in part on a lower bound cost, the lower bound cost being an estimate of a lowest cost of an action to alter a first state of the vehicle at a time associated with a beginning of the first candidate action;

determining, based at least in part on the first candidate action and the sensor data, a first prediction associated with a first state of the environment, the first prediction comprising a first state of an object in the environment at a future time;

determining, based at least in part on the first prediction and the route data, a second candidate action for controlling motion of the vehicle;

determining a second cost associated with the second candidate action, the second cost based at least in part on an upper bound cost, the upper bound cost being an estimate of a cost to execute a default action;

alternately applying one of the lower bound cost and the upper bound cost to one or more subsequent candidate actions; and controlling the vehicle based at least in part on:

a path that comprises the first candidate action and the second candidate action; and determining a first total cost associated with the first candidate action and the second candidate action.

8. The system of claim 7, wherein the operations further comprise:

determining, by a machine-learned model and based at least in part on the sensor data, that the object is a reactive object; and determining, based at least in part on executing a first simulation using the determination that the object is a reactive object, the first prediction, wherein executing the first simulation using the determination that the object is a reactive object comprises determining a motion of a representation of the object based at least in part on the first candidate action.

9. The system of claim 7, wherein the operations further comprise:

determining, by a machine-learned model and based at least in part on the sensor data, that the object is a passive object; and determining, based at least in part on modeling motion of the passive object, the first prediction, wherein modeling motion of the passive object comprises determining motion of the passive object based at least in part on a state of the object and exclusive of the first candidate action.

10. The system of claim 7, wherein the operations further comprise assigning, to a same prediction node of a data structure, the first candidate action, and the second candidate action, the first prediction and a second prediction associated with a same prediction layer as the first prediction based at least in part on:

determining a first set of candidate actions based at least in part on the first prediction and a second set of candidate actions based at least in part on the second prediction;

determining a first action from among the first set associated with a first minimum cost from among costs associated with the first set;

determining a second action from among the second set associated with a second minimum cost from among costs associated with the first set; and determining that the first action and the second action are associated with positions that are within a distance from each other that is less than a threshold distance.

11. The system of claim 7, wherein the operations further comprise:

determining, based at least in part on the sensor data, a likelihood that the object will modify a behavior in response to one or more of the first candidate action or the second candidate action; and one of:

determining to classify the object as a reactive agent based at least in part on the likelihood meeting or exceeding a threshold; or determining to classify the object as a passive agent based at least in part on the likelihood being less than or equal to the threshold.

12. The system of claim 7, wherein the lower bound cost is zero and the upper bound cost is determined based at least in part on at least one of the second candidate action or a cost associated with a default trajectory.

13. The system of claim 7, wherein controlling the vehicle based at least in part on the path is further based at least in part on determining that the first total cost is less than a threshold or less than a second total cost associated with a second path comprising at least one candidate action that is different from at least one of the first candidate action or the second candidate action.

14. A non-transitory computer-readable medium storing processor-executable instructions that, when executed by one or more processors, cause one or more processors to perform operations comprising:

receiving route data associated with a start position and an end position in an environment;

receiving sensor data from a sensor;

determining, based at least in part on the sensor data and the route data, a first candidate action for controlling motion of a vehicle;

determining a first cost associated with the first candidate action, the first cost being based at least in part on a lower bound cost or an upper bound cost;

determining, based at least in part on the first candidate action and the sensor data, a first prediction associated with a first state of the environment, the first prediction comprising a first state of an object in the environment at a future time;

determining, based at least in part on the first prediction and the route data, a second candidate action for controlling motion of the vehicle;

determining a second cost associated with the second candidate action, the second cost based at least in part on the lower bound cost or the upper bound cost;

alternately applying one of the lower bound cost and the upper bound cost to one or more subsequent candidate actions; and controlling the vehicle based at least in part on:
a path that comprises the first candidate action and the second candidate action; and
determining a first total cost associated with the first candidate action and the second candidate action.

15. The non-transitory computer-readable medium of claim 14, wherein the operations further comprise:
determining, by a machine-learned model and based at least in part on the sensor data, that the object is a reactive object; and
determining, based at least in part on executing a first simulation using the determination that the object is a reactive object, the first prediction,
wherein executing the first simulation using the determination that the object is a reactive object comprises determining a motion of a representation of the object based at least in part on the first candidate action.

16. The non-transitory computer-readable medium of claim 14, wherein the operations further comprise:
determining, by a machine-learned model and based at least in part on the sensor data, that the object is a passive object; and
determining, based at least in part on modeling motion of the passive object, the first prediction,
wherein modeling motion of the passive object comprises determining motion of the passive object based at least in part on a state of the object and exclusive of the first candidate action.

17. The non-transitory computer-readable medium of claim 14, wherein the operations further comprise assigning, to a same prediction node of a data structure, the first candidate action, and the second candidate action, the first prediction and a second prediction associated with a same prediction layer as the first prediction based at least in part on:
determining a first set of candidate actions based at least in part on the first prediction and a second set of candidate actions based at least in part on the second prediction;
determining a first action from among the first set associated with a first minimum cost from among costs associated with the first set;
determining a second action from among the second set associated with a second minimum cost from among costs associated with the first set; and
determining that the first action and the second action are associated with positions that are within a distance from each other that is less than a threshold distance.

18. The non-transitory computer-readable medium of claim 14, wherein the operations further comprise:
determining, based at least in part on the sensor data, a likelihood that the object will modify a behavior in response to one or more of the first candidate action or the second candidate action; and
one of:
determining to classify the object as a reactive agent based at least in part on the likelihood meeting or exceeding a threshold; or
determining to classify the object as a passive agent based at least in part on the likelihood being less than or equal to the threshold.

19. The non-transitory computer-readable medium of claim 14, wherein:
the lower bound cost is an estimate of a minimum cost of an action to alter a first state of the vehicle at a time associated with a beginning of the first candidate action; and
the upper bound cost is determined based at least in part on at least one of the second candidate action or a cost associated with a default trajectory.

20. The non-transitory computer-readable medium of claim 14, wherein controlling the vehicle based at least in part on the path is further based at least in part on determining that the first total cost is less than a threshold or less than a second total cost associated with a second path comprising at least one candidate action that is different from at least one of the first candidate action or the second candidate action.

* * * * *